United States Patent
Okamoto et al.

(10) Patent No.: US 6,780,140 B2
(45) Date of Patent: Aug. 24, 2004

(54) LOCKUP CONTROL SYSTEM OF AUTOMATIC TRANSMISSION

(75) Inventors: Norihiko Okamoto, Hiroshima (JP); Nobuyori Nakajima, Shizuoka (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 10/420,004

(22) Filed: Apr. 22, 2003

(65) Prior Publication Data
US 2004/0018913 A1 Jan. 29, 2004

(30) Foreign Application Priority Data
Apr. 25, 2002 (JP) .................................... 2002-124730

(51) Int. Cl.$^7$ .............................................. F16H 61/58
(52) U.S. Cl. ................... 477/62; 477/168; 477/169; 477/176
(58) Field of Search ..................... 477/62, 168, 169, 477/176

(56) References Cited

U.S. PATENT DOCUMENTS

| | | | |
|---|---|---|---|
| 4,940,122 A | | 7/1990 | Fujieda |
| 5,085,301 A | * | 2/1992 | Imamura et al. ............ 477/169 |
| 5,343,990 A | * | 9/1994 | Iizuka ....................... 192/3.31 |
| 5,616,099 A | * | 4/1997 | Sakai ......................... 477/169 |
| 5,667,458 A | * | 9/1997 | Narita et al. ................. 477/169 |
| 5,935,043 A | * | 8/1999 | Watanabe et al. ............ 477/169 |
| 5,947,865 A | * | 9/1999 | Watanabe et al. ............ 477/169 |
| 6,059,690 A | * | 5/2000 | Tanizawa et al. ............ 477/169 |
| 6,139,472 A | * | 10/2000 | Harada et al. ............... 477/169 |
| 6,663,533 B2 | * | 12/2003 | Toyoda et al. ................. 477/62 |

FOREIGN PATENT DOCUMENTS

JP 1-206160 A 8/1989

* cited by examiner

Primary Examiner—Charles A. Marmor
Assistant Examiner—David D. Le
(74) Attorney, Agent, or Firm—Foley & Lardner LLP

(57) ABSTRACT

In a lockup control system of an automatic transmission with a lockup torque converter, a controller pre-stores a predetermined lockup control map including at least a predetermined coast slip lockup area, within which the system executes a slip lockup control mode under the vehicle's coasting condition, so that a speed difference between input and output speeds of the torque converter is brought closer to a predetermined value. The controller determines whether a first transition from the vehicle's driving condition to the predetermined coast slip lockup area occurs in a release mode of the lockup clutch or a second transition from the vehicle's coasting condition to the predetermined coast slip lockup area occurs in the release mode. When the first transition occurs, the lockup clutch is conditioned in the slip lockup control mode. When the second transition occurs, the lockup clutch is conditioned in the release mode.

8 Claims, 13 Drawing Sheets

LOCKUP CONTROL SYSTEM OF AUTOMATIC TRANSMISSION

TECHNICAL FIELD

The present invention relates to a lockup control system of an automatic transmission with a so-called lockup torque converter, capable of engaging or disengaging a lockup clutch depending on engine/vehicle operating conditions.

BACKGROUND ART

In recent years, there have been proposed and developed various technologies for controlling an automatic transmission torque-converter lockup clutch, to provide various merits, that is, reduced internal slippage, improved fuel economy, reduced torque shock during engagement of the lockup clutch, or a better engine braking effect during coasting of the vehicle. One such lockup control system has been disclosed in Japanese Patent Provisional Publication No. 1-206160 (hereinafter is referred to as "JP1-206160") corresponding to U.S. Pat. No. 4,940,122 issued on Jul. 10, 1990. According to a transmission torque-converter lockup clutch slip control system disclosed in JP1-206160, a predetermined speed difference between a driving member (i.e., a pump impeller) and a driven member (i.e., a turbine runner), in other words, a predetermined slippage rate of the transmission torque-converter lockup clutch is permitted by way of closed-loop feedback control, often called "slip lockup control", so as to effectively reduce torque shock occurring during lockup-clutch engagement. JP1-206160 also teaches the creation of an engine braking force during coasting by way of the slip lockup control. The slip lockup control action executed during coasting is often called "coast slip lock-up". As is generally known, in an electronically-controlled engine employing a deceleration fuel cutoff device, capable of executing fuel cutoff operation, such as when in overrun (going down a hill) or in city traffic, as well as for engine speed limitation, the fuel cutoff operation usually terminates when the engine speed reduces to below a predetermined engine speed. A fuel cutoff time interval, during which the fuel cutoff operation is continuously executed, can be lengthened by engagement of the lockup clutch during the coast slip lockup control, because of torque transferred from rotating drive wheels back to the engine crankshaft via the lockup clutch partially engaged when the vehicle coasts. This contributes to improved fuel economy.

SUMMARY OF THE INVENTION

However, in the torque-converter lockup clutch slip control system as described in JP1-206160, a coast slip lockup area is determined or set irrespective of engine/vehicle operating conditions detected just before a transition to the coast slip lockup area. Concretely, a threshold value required to switch to the coast slip lockup area is set or fixed to a certain vehicle speed that there is a less torque shock, in other words, a less change in rotational inertia of each rotating element even when initiating a coast slip lockup operating mode that permits a slippage between driving and driven members responsively to a rise in the vehicle speed during coasting. Therefore, it is difficult to provide an adequate coast slip lockup area. The inadequate coast slip lockup area results in a poor engine braking performance, for example, a degraded engine braking force, and an increase in fuel consumption. For instance, when the engine/vehicle operating condition, detected just before the transition to the slip lockup area, is the drive operating mode (the vehicle's driving condition) with the lockup clutch deactivated or released, a lockup piston tends to be attracted toward a torque converter cover by way of action of hydraulic oil in a so-called release chamber defined between the torque converter cover and the lockup piston. When initiating the slip lockup control during such a vehicle's driving condition, the lockup piston can be easily moved in its axial direction by a slight change in hydraulic pressure, for the same vehicle speed as the vehicle's coasting condition. Additionally, during the vehicle's driving condition, there is a less speed difference between engine speed Ne and turbine speed Nt, and thus there is a less torque shock when initiating the slip lockup control. On the contrary, when the engine/vehicle operating condition, detected just before the transition to the coast slip lockup area, is the vehicle's coasting condition with the lockup clutch deactivated or released, a flow rate of hydraulic oil in an apply chamber of the torque converter side tends to be greater than that in the release chamber. As a result of this, the lockup piston tends to be attracted toward the turbine runner. Under this condition, the distance of the lockup piston relative to the torque converter cover becomes a maximum. For the reasons discussed above, when initiating the coast lockup control during such a vehicle's coasting condition, the lockup control system has to greatly increase a rate of change in hydraulic pressure with respect to time. As a matter of course, the increased time rate of change in hydraulic pressure may cause a rapid axial movement of the lockup piston. For the same vehicle speed as the vehicle's driving condition, under the vehicle's coasting condition the speed difference between engine speed Ne and turbine speed Nt tends to become relatively greater. Therefore, when initiating the coast slip lockup control from a so-called non-lockup state (a fully-disengaged state of the lockup clutch) under the coasting condition during which torque is transferred from rotating drive wheels back to the engine, there is an increased tendency for a comparatively great torque shock to occur owing to both the increased time rate of change in hydraulic pressure and relatively greater speed difference between driving and driven members.

Accordingly, it is an object of the invention to provide a lockup control system of an automatic transmission, capable of enlarging a slip lockup area over wider range of engine/vehicle operating conditions (containing a low and middle vehicle speed range as well as a high vehicle speed range) without undesirable torque shock, occurring due to engagement of a lockup clutch, and thus improving fuel economy while assuring a better engine braking performance.

In order to accomplish the aforementioned and other objects of the present invention, a lockup control system of an automatic transmission with a torque converter having a lockup clutch, comprises an operating condition detector that detects an operating condition on an engine and an automotive vehicle, the operating condition including at least a throttle opening and a vehicle speed, a controller that controls a transmission ratio and an engaging state of the lockup clutch, responsively to an operating point determined based on the throttle opening and the vehicle speed, the controller pre-storing a predetermined lockup control map including at least a predetermined coast slip lockup area, within which the lockup control system executes a slip lockup control mode under a vehicle's coasting condition that torque is transferred from drive wheels to the engine, so that a speed difference between input and output speeds of the torque converter is brought closer to a predetermined value, the controller determining whether a first transition from a vehicle's driving condition under which torque is transferred from the engine to the drive wheels to the predetermined coast slip lockup area occurs in a release mode of the lockup clutch or a second transition from the vehicle's coasting condition to the predetermined coast slip lockup area occurs in the release mode of the lockup clutch, and the controller controlling the lockup clutch depending on whether the first transition occurs or the second transition occurs, so that the lockup clutch is conditioned in the slip lockup control mode when the first transition occurs, and that the lockup clutch is conditioned in the release mode when the second transition occurs.

The other objects and features of this invention will become understood from the following description with reference to the accompanying drawings.

DESCRIPTION OF THE PREFERRED EMBODIMENTS

Figure 1:
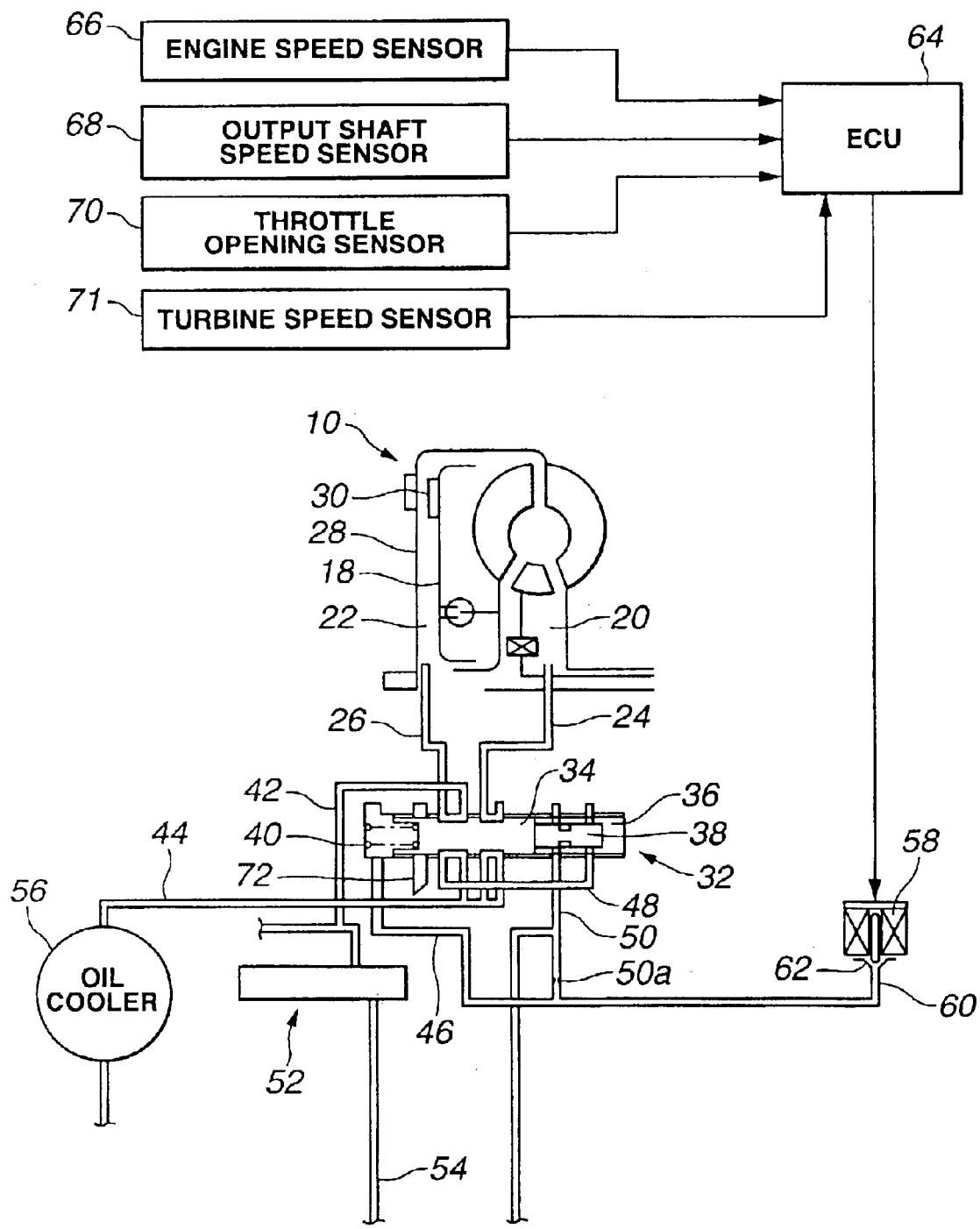
FIG. 1 is a system block diagram illustrating a first embodiment of a lockup control system of an automatic transmission.

Referring now to the drawings, particularly to FIG. 1, an automatic transmission torque converter 10 employs therein a lockup clutch 18. Lockup clutch 18 is formed on its left-hand side face (viewing FIG. 1) with a clutch facing 30 that is brought into contact with a frictional surface of a right-hand sidewall of a torque converter cover 28. A release chamber 22 is defined between the right-hand sidewall of cover 28 and the left-hand side face of lockup clutch 18, whereas an apply chamber 20 is defined on the right-hand side of lockup clutch 18. The axial position of the lockup clutch varies depending on the pressure differential between the hydraulic pressure in apply chamber 20 and the hydraulic pressure in release chamber 22. That is, lockup clutch 18 can be engaged or disengaged, based on the pressure differential, often called a "lockup pressure differential". Apply chamber 20 is connected via an oil passage 24 to a lockup control valve 32, whereas release chamber 22 is connected via an oil passage 26 to lockup control valve 32. Lockup control valve 32 controls hydraulic pressure supply to each of apply chamber 20 and release chamber 22. As can be seen from the cross section of lockup control valve 32 in FIG. 1, lockup control valve 32 is comprised of a valve spool 34, a sleeve 36, a plug 38, and a return spring 40. Oil passages 42, 44, 46, 48, and 50 are connected to lockup control valve 32. Oil passage 42 is connected to a torque-converter relief valve 52 from which a constant pressure is supplied into oil passage 42. Relief valve 52 fulfills a pressure-regulation function, utilizing a regulated hydraulic pressure in an oil passage 54. The regulated hydraulic pressure means a pressure, which is regulated to a pressure value substantially corresponding to engine torque by means of a pressure regulator valve (not shown), and then supplied into torque-converter relief valve 52. Oil passage 44 is connected to an oil cooler 56, so that hydraulic oil or working fluid (transmission fluid), fed from oil passage 44 to oil cooler 56, is used for lubrication of moving parts. A constant hydraulic pressure that is regulated by means of a pressure regulator valve (not shown) is supplied into oil passage 50. Oil passage 46, branched from oil passage 50 via a constricting orifice 50a, is connected to a lockup solenoid valve 58. Lockup solenoid valve 58 is constructed as a normally-closed electromagnetic solenoid valve having a plunger 62 capable of closing the opening end 60 of oil passage 46 by de-energizing the electromagnetic solenoid of lockup solenoid valve 58. Lockup solenoid valve 58 is cyclically energized by a pulsewidth modulated (PWM) signal at a controlled duty cycle. The PWM signal having a controlled duty cycle is generated from an electronic control unit (ECU) or a controller 64 (described later) to the lockup solenoid. The opening degree of opening end 60 of oil passage 46 is variably controlled by controlling the on and off duration of the duty cycle signal from ECU 64. That is, the hydraulic pressure in oil passage 46 can be regulated in inverse proportion to the rate of the on time duration (relating to "on duty ratio") to the off time duration (relating to "off duty ratio"). More concretely, the hydraulic pressure in oil passage 46 falls, as the on duty ratio (the on duration) increases. In other words, the hydraulic pressure in oil passage 46 rises, as the on duty ratio (the on duration) decreases. Controller 64 generally comprises a microcomputer and a drive circuitry. Controller 64 includes an input/output interface (I/O), memories (RAM, ROM), and a microprocessor or a central processing unit (CPU). The input/output interface (I/O) of controller 64 receives input information from various engine/vehicle sensors, namely an engine speed sensor (or an engine-crankshaft position sensor) 66, a transmission output shaft speed sensor 68, a throttle opening sensor 70, and a torque-converter turbine speed sensor 71. Engine speed sensor 66 tells the controller at what engine speed the engine is rotating, and generates an engine speed indicative signal Ne. Output shaft speed sensor 68 tells the controller at what speed the transmission output shaft is rotating, and generates a transmission output shaft speed indicative signal $N_o$. Throttle opening sensor 70 is provided to monitor or detect a throttle opening TVO of a throttle valve (not shown). Turbine speed sensor 71 tells the controller at what speed a torque-converter turbine runner (not numbered) is rotating, and generates a turbine speed indicative signal Nt. Within controller 64, the central processing unit (CPU) allows the access by the I/O interface of input informational data signals from the previously-discussed engine/vehicle sensors 66, 68, 70, and 71. The CPU of controller 64 is responsible for carrying a control program (see FIG. 3) stored in the memories and capable of performing necessary arithmetic and logic operations. A computational result (an arithmetic calculation result), that is, a calculated output signal (e.g., a solenoid drive current) is relayed through the output interface circuitry (having a digital-to-analog conversion function) via the drive circuitry (having an amplification function that amplifies an input signal from the output interface circuitry to produce a drive signal) to an output stage, namely the electromagnetic solenoid of lockup solenoid valve 58. Within controller 64 shown in FIG. 1, a predetermined lockup control routine (see FIG. 3) is executed by the CPU of controller 64, in such a manner as to realize a preprogrammed lockup control shown in FIGS. 2, 4A–4D and 5A–5D. Controller 64 is also designed to calculate or estimate or map-retrieve a torque-converter input torque TQ based on engine speed Ne, from a predetermined or preprogrammed engine-speed Ne versus input-torque TQ characteristic map showing how input torque TQ has to be varied relative to engine speed Ne.

Lockup clutch 18 can be held in its release state (its disengaged state), as discussed hereunder.

The state of opening end 60 of oil passage 46 is gradually transferred to the fully-closed state by decreasing the on duty ratio. With the opening end 60 fully closed, the hydraulic pressure in oil passage 46 rises and then becomes identical to the hydraulic pressure in oil passage 50, while acting on the leftmost end (viewing FIG. 1) of valve spool 34 of lockup control valve 32. Under this condition, valve spool 34 is kept at the leftmost spool-valve position shown in FIG. 1, so that fluid communication between oil passages 42 and 26 is established and at the same time fluid communication between oil passages 44 and 24 is established. Thus, the hydraulic pressure in oil passage 42 is supplied through oil passage 26 into release chamber 22. Thereafter, the working fluid in release chamber 22 flows through an aperture defined between the frictional surface of torque converter cover 28 and clutch facing 30 into apply chamber 20, and returns through oil passage 24 to lockup control valve 32, and then drains into oil passage 44. As a consequence, the hydraulic pressure fed through oil passage 26 into release chamber 22 becomes identical to the hydraulic pressure in apply chamber 20. In this manner, lockup clutch 18 is kept in the release state, and thus torque converter 10 is conditioned in a torque converter state in which torque can be transmitted via only the working fluid.

Lockup clutch 18 can be gradually shifted from the clutch release state to a clutch engagement state (or a clutch application state), as discussed hereunder.

In this case, first of all, the on duty ratio of the duty cycle signal from controller 64 has to be gradually increased. The amount of working fluid exhausted from opening end 60 of oil passage 46 gradually increases and thus the hydraulic pressure in oil passage 46 gradually drops, as the on duty ratio of the duty cycle signal from controller 64 gradually increases. As a result, the hydraulic pressure acting on the leftmost end of valve spool 34 tends to fall, and therefore valve spool 34 and plug 38 both axially move leftwards by a predetermined stroke. Thus, slight fluid communication between oil passage 26 and a drain port 72 is established and simultaneously fluid communication between oil passage 42 and oil passage 24 is established. On the other hand, the hydraulic pressure in oil passage 26 is fed back to the right-hand end of plug 38 through oil passage 48, and thus lockup control valve 32 is conditioned in a pressure regulation state. Under the pressure regulation state, the hydraulic pressure in oil passage 26 can be regulated or controlled in response to the hydraulic pressure fed through oil passage 46 and acting on the leftmost end of valve spool 34. Under these conditions, the hydraulic pressure is fed from oil passage 24 into apply chamber 20. After this, the working fluid in apply chamber 20 flows through the aperture defined between the frictional surface of torque converter cover 28 and clutch facing 30 into release chamber 22, and returns through oil passage 26 to lockup control valve 32, and then drains into drain port 72. The hydraulic pressure in oil passage 26 is controlled by the hydraulic pressure in oil passage 46, which is regulated in inverse proportion to the rate of the on duty ratio to the off duty ratio. The on duty ratio is often called as a "lockup duty ratio". As a consequence, the hydraulic pressure in release chamber 22 becomes lower than that in apply chamber 20. The pressure differential between apply and release chambers 20 and 22, often called "lockup pressure differential", forces clutch facing 30 of lockup clutch 18 into contact with the frictional surface of torque converter cover 28. As discussed above, the engaging force of lockup clutch 28, that is, the slippage rate of lockup clutch 28, in other words, the lockup pressure differential can be controlled by means of lock-up solenoid valve 58.

Figure 2:
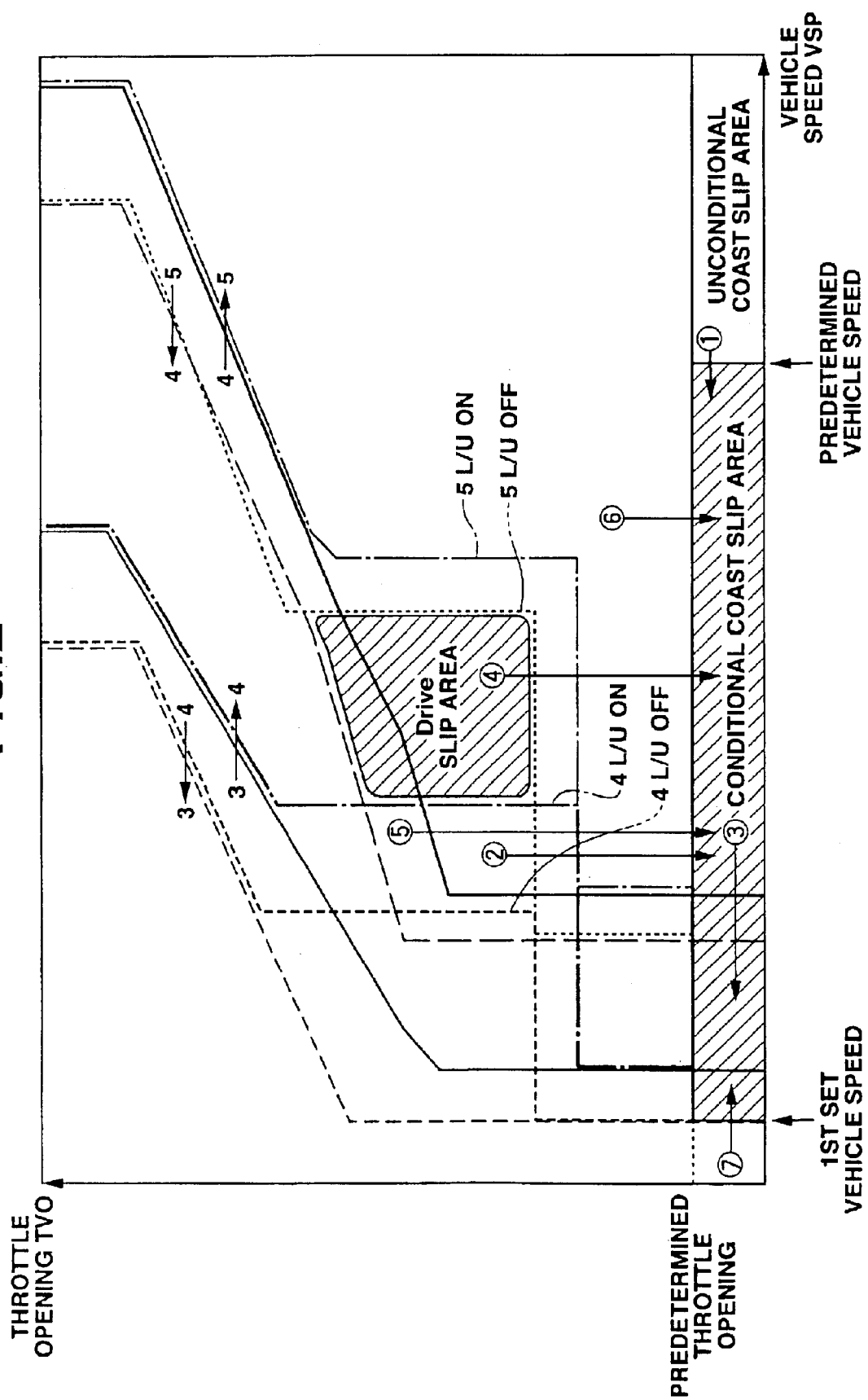
FIG. 2 is a lockup control map for the lockup control system of the first embodiment.

Referring now to FIG. 2, there is shown the predetermined or preprogrammed lockup control map according to which lockup clutch 18 is controlled depending on the on duty ratio (the lockup duty ratio) of the duty cycle signal from controller 64 incorporated in the lockup control system of the first embodiment of FIG. 1. The lockup control section of controller 64 pre-stores the preprogrammed lockup control map. In the preprogrammed lockup control map shown in FIG. 2, the axis of ordinate (the y-coordinate in a Cartesian coordinate system in the plane) indicates throttle opening TVO, while the axis of abscissa (the x-coordinate in a Cartesian coordinate system in the plane) indicates a vehicle speed VSP. Vehicle speed VSP can be generally estimated based on the output signal from transmission output shaft speed sensor 68. The CPU of controller 64 determines, based on both vehicle speed VSP and throttle opening TVO, information regarding which operating state the engine/vehicle is in. Controller 64 executes an optimal transmission ratio changing control and selects an optimal lockup control mode and optimally controls the engaging state of lockup clutch 18, responsively to the current engine/vehicle operating state (or the current engine/vehicle operating point). As can be clearly seen from the preprogrammed lockup control map of FIG. 2, in the control system of the shown embodiment, there are eight mode switching lines, namely a 3rd-to-4th upshift line, a 4th-to-3rd downshift line, a 4th-to-5th upshift line, a 5th-to-4th downshift line, a 4th-gear lockup off line, a 4th-gear lockup on line, a 5th-gear lockup off line, and a 5th-gear lockup on line. There is a first hysteresis between the 4th-gear lockup off line and the 4th-gear lockup on line for control hunting avoidance. In a similar manner, there is a second hysteresis between the 5th-gear lockup off line and the 5th-gear lockup on line for control hunting avoidance. When the engine/vehicle operating point passes the 4th-gear lockup on line toward the speed-increase side (higher ratio), lockup clutch 18 transfers to a completely-engaged state, in other words, a lockup mode (L/U ON) in which the speed difference between torque-converter driving and driven members (the speed difference between torque-converter input and output speeds) is "0". On the contrary, when the engine/vehicle operating point passes the 4th-gear lockup off line toward the speed-reduction side (lower ratio) under the lockup completely-engaged state or the lockup mode (L/U ON), lockup clutch 18 transfers to a completely-disengaged state, in other words, a non-lockup mode (L/U OFF). In a similar manner, when the engine/vehicle operating point passes the 5th-gear lockup on line toward the speed-increase side (higher ratio), lockup clutch 18 transfers to the completely-engaged state (the lockup mode). On the contrary, when the engine/vehicle operating point passes the 5th-gear lockup off line toward the speed-reduction side (lower ratio) under the lockup completely-engaged state, lockup clutch 18 transfers to the completely-disengaged state (the non-lockup mode). Suppose that the operating point passes over to the other side of each of the 3rd-to-4th upshift line, the 4th-to-3rd downshift line, the 4th-to-5th upshift line, and the 5th-to-4th downshift line with lockup clutch 18 conditioned in the completely-engaged state. At this time, a 3–4 upshift, a 4–3 downshift, a 4–5 upshift, or a 5–4 downshift occurs. During a downshift or an upshift occurring within the other areas except the conditional coast slip lockup area, the lockup control system automatically temporarily releases or disengages the torque-converter lock-up feature and then reapplies lockup clutch 18 once the shift has been completed. On the other hand, during a downshift (e.g., a 5–4 downshift) or an upshift (e.g., a 3–4 upshift or a 4–5 upshift) occurring within the conditional coast slip lockup area, the lockup control system inhibits the torque-converter lock-up feature from being temporarily released. In addition to the above, as seen from the substantially central left-hand diagonal shading area, the lower left-hand diagonal shading area, and the lower right-hand side area of the preprogrammed lockup control map of FIG. 2, a drive slip area, a conditional coast slip area (exactly, a conditional coast slip lockup area), and an unconditional or ordinary coast slip area (exactly, an unconditional coast slip lockup area) are provided or set. In the lockup control system of the first embodiment, the drive slip area indicated by the substantially central left-hand diagonal shading area is set within a 5th gear range and non-lockup area. Under engine/vehicle operating conditions (at operating points) corresponding to the drive slip area, there is an increased tendency for engine vibrations and noise to occur. Therefore, even under the vehicle's driving condition during which torque (power) is transferred from the engine to the drive wheels, the system of the first embodiment executes slip lockup control within the drive slip area, so that the speed difference between torque-converter input and output speeds is brought closer to a predetermined value. The slip lockup control executed within the drive slip area will be hereinafter is referred to as a "drive slip lockup control". During the drive slip lockup control, engine speed Ne tends to be greater than turbine speed Nt (Ne>Nt) owing to the power transmission from the engine to the drive wheels with the partially-engaged lockup clutch. On the other hand, the unconditional coast slip area corresponding to the lower right-hand side area of the preprogrammed lockup control map of FIG. 2, is set to a first specified area wherein throttle opening TVO is less than a predetermined throttle opening such as a $3/32$ throttle opening and vehicle speed VSP is greater than a predetermined vehicle speed $VSP_0$ such as 120 km/h. The first specified area (TVO<$3/32$ and VSP>$VSP_0$) corresponds to engine/vehicle operating conditions (at operating points) that there is a less speed difference between engine speed Ne and turbine speed Nt. Thus, the system of the first embodiment unconditionally or always executes the coast slip lockup control in the presence of the transition of the operating point, which is based on both the current value of vehicle speed VSP and the current value of throttle opening TVO, to the unconditional coast slip area, irrespective of engine/vehicle operating conditions detected just before the transition to the unconditional coast slip area. Finally, the conditional coast slip area corresponding to the lower left-hand diagonal shading area of the preprogrammed lockup control map of FIG. 2, is further provided and set to a second specified area wherein throttle opening TVO is less than the predetermined throttle opening such as a $3/32$ throttle opening and vehicle speed VSP is greater than a first set vehicle speed such as 25 km/h and less than or equal to predetermined vehicle speed $VSP_0$ such as 120 km/h. The second specified area (TVO<$3/32$ and 25 km/h<VSP≦120 km/h) corresponds to engine/vehicle operating conditions (at operating points) that the speed difference |Ne−Nt| between engine speed Ne and turbine speed Nt tends to remarkably change depending on engine/vehicle operating conditions detected just before the transition to the conditional coast slip area. Therefore, just before the transition to the conditional coast slip area, taking into account the magnitude of torque shock, the system of the first embodiment has to determine or discriminate, based on the engine/vehicle operating condition (the operating point) detected just before the transition to the conditional coast slip area, whether or not the coast slip lockup control should be initiated. According to the coast slip lockup control executed within the unconditional coast slip area or the conditional coast slip area, the speed difference between torque-converter input and output speeds is brought closer to a predetermined value under the vehicle's coasting condition (in presence of the power transmission from the drive wheels to the engine). During the coast slip lockup control executed within the unconditional coast slip area or the conditional coast slip area, turbine speed Nt tends to be greater than engine speed Ne (Nt>Ne) owing to the power transmission from the drive wheels to the engine with the partially-engaged lockup clutch.

Figure 3:
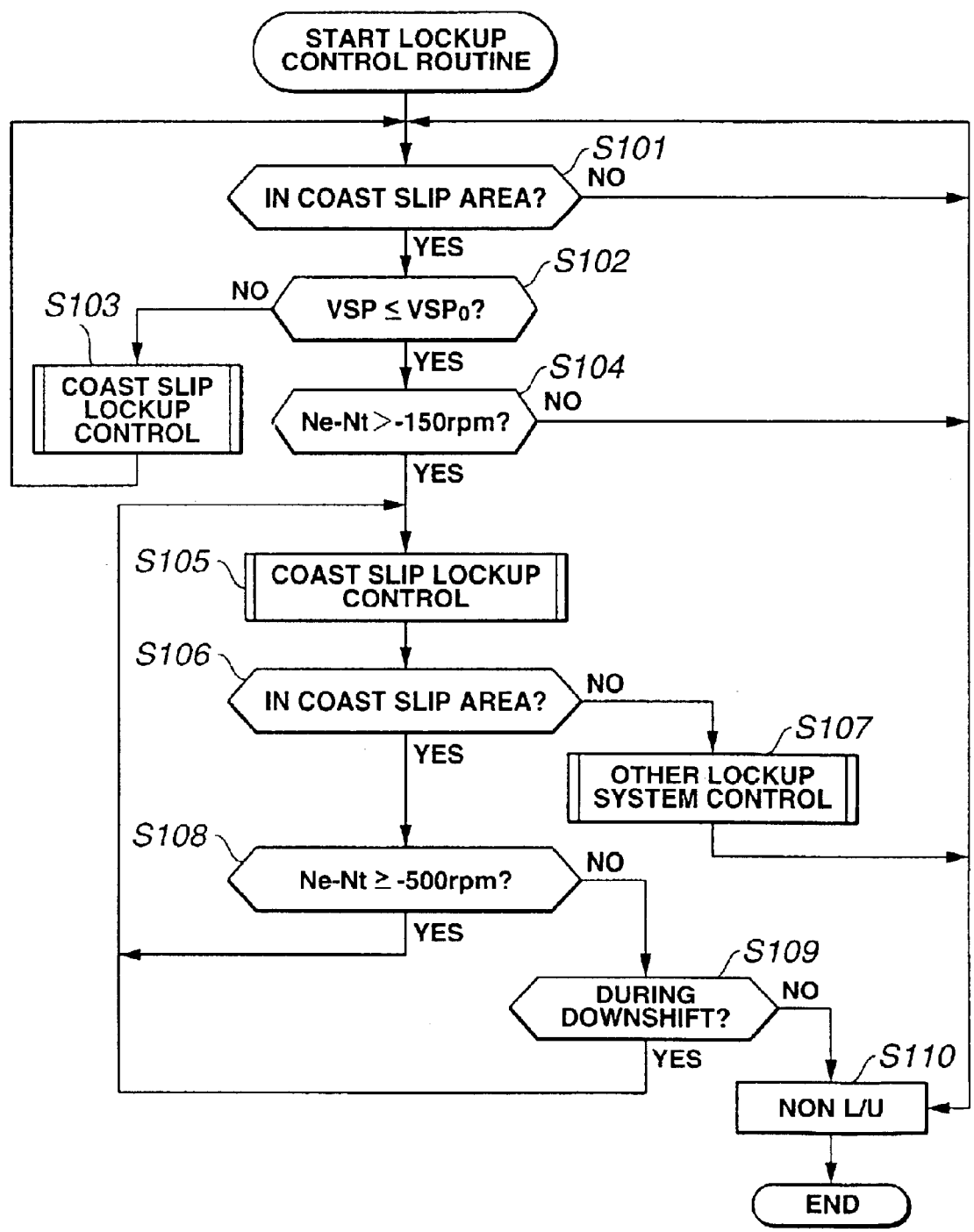
FIG. 3 is a flow chart illustrating a lockup control routine executed by the system of the first embodiment.

Referring now to FIG. 3, there is shown the lockup control routine executed by the lockup control system of the first embodiment of FIG. 1. The arithmetic processing or the lockup control routine shown in FIG. 3 is executed as time-triggered interrupt routines to be triggered every predetermined sampling time intervals for example 10 milliseconds.

At step S101, a check is made to determine whether the current engine/vehicle operating point is conditioned in the coast slip area (exactly, in either of the unconditional coast slip area and the conditional coast slip area). When the answer to step S101 is in the affirmative (YES), that is, when the current engine/vehicle operating point is conditioned in the unconditional coast slip area or the conditional coast slip area, the routine proceeds from step S101 to step S102. Conversely when the answer to step S101 is in the negative (NO), that is, when the current engine/vehicle operating point is conditioned in neither the unconditional coast slip area nor the conditional coast slip area, the routine proceeds from step S101 to step S110.

At step S102, a comparison check is made to determine whether vehicle speed VSP is less than or equal to predetermined vehicle speed $VSP_0$ (VSP≦120 km/h). When the answer to step S102 is affirmative (YES),e.g., VSP≦$VSP_0$, the system of the first embodiment determines that the current operating point is conditioned in the conditional coast slip area, and then the routine proceeds from step S102 to step S104. Conversely when the answer to step S102 is negative (NO), that is, VSP>VSP$_0$, the system of the first embodiment determines that the current operating point is conditioned in the unconditional coast slip area, and then the routine proceeds from step S102 to step S103.

At step S103, the system initiates the coast slip lockup control. Thereafter, the routine returns from step S103 to step S101.

At step S104, a comparison check is made to determine whether a difference (Ne−Nt), which is obtained by subtracting turbine speed Nt from engine speed Ne, is greater than a predetermined criterion value (a second criterion value) such as −150 rpm. That is to say, the system of the first embodiment estimates or determines, based on the comparison result of the predetermined criterion value (−150 rpm) and the difference (Ne−Nt), whether the engine/vehicle operating condition (the operating point) detected just before the transition to the conditional coast slip area is the vehicle's coasting condition or the vehicle's driving condition. Concretely, when the difference (Ne−Nt) is greater than the predetermined criterion value such as −150 rpm, that is, in case of (Ne−Nt)>−150 rpm, the system of the first embodiment determines that the engine/vehicle operating condition detected just before the transition to the conditional coast slip area is equal to the vehicle's driving condition during which torque (power) is transferred from the engine to the drive wheels. In this case, the routine proceeds from step S104 to step S105. On the contrary, when the difference (Ne−Nt) is less than or equal to the predetermined criterion value such as −150 rpm, that is, in case of (Ne−Nt)≦−150 rpm, the system of the first embodiment determines that the engine/vehicle operating condition detected just before the transition to the conditional coast slip area is equal to the vehicle's coasting condition. In this case, the routine jumps from step S104 to step S110. Briefly speaking, controller 64 controls lockup clutch 18 depending on whether a first transition from the vehicle's driving condition to the predetermined coast slip lockup area occurs under the release mode of lockup clutch 18 or (ii) a second transition from the vehicle's coasting condition to the predetermined coast slip lockup area occurs under the release mode, so that lockup clutch 18 is conditioned in the slip lockup control mode when the first transition occurs and that lockup clutch 18 is conditioned in the release mode when the second transition occurs.

At step S105, the system initiates the coast slip lockup control.

At step S106, in a similar manner to step S101, a check is made again to determine whether the current engine/vehicle operating point is conditioned in either of the unconditional coast slip area and the conditional coast slip area. When the answer to step S106 is in the affirmative (YES), in other words, when the current engine/vehicle operating point is conditioned in the unconditional coast slip area or the conditional coast slip area, the routine proceeds from step S106 to step S108. Conversely when the answer to step S106 is in the negative (NO), that is, when the current engine/vehicle operating point is conditioned in neither the unconditional coast slip area nor the conditional coast slip area, the routine proceeds from step S106 to step S107.

At step S107, the coast slip lockup control is inhibited and in lieu thereof the other lockup system control (e.g., the full lockup control) except the coast slip lockup control is executed. Thereafter, the routine returns from step S107 to step S101.

At step S108, a comparison check is made to determine whether a difference (Ne−Nt), which is obtained by subtracting turbine speed Nt from engine speed Ne, is greater than or equal to a predetermined criterion value (a first criterion value) such as −500 rpm above which the coast slip lockup control can be continuously executed. When the answer to step S108 is in the affirmative (YES), that is, in case of (Ne−Nt)≧−500 rpm, the routine flows from step S108 to step S105. Conversely when the answer to step S108 is in the negative (NO), that is, in case of (Ne−Nt)<−500 rpm, the routine proceeds from step S108 to step S109.

At step S109, a check is made to determine whether a downshift occurs. When the answer to step S109 is affirmative (YES), that is, during the downshift, the difference (Ne−Nt) tends to become greater, because there is a slight time delay until engine speed Ne begins to rise after a rise in the transmission output shaft speed. Assuming that the lockup control system releases the coast slip control (the coast slip lockup feature) during the downshift, there is a drawback that it is impossible to restart the coast slip lockup control until the vehicle speed increases adequately. This means an undesirably narrowed slip lockup area. To widen the slip lockup area as much as possible, during the downshift the routine returns from step S109 to step S105, so as to continue the coast slip lockup control. Conversely when the answer to step S109 is negative (NO), that is, when a downshift does not occur, the routine flows from step S109 to step S110. The presence or absence of the downshifting is determined depending on whether a transmission ratio (Nt/N$_o$), which is represented by a ratio of turbine speed Nt to transmission output shaft speed N$_o$, is changing.

At step S110, the system of the first embodiment releases lockup clutch 18 and as a result a transition to the non-lockup (NON L/U) area occurs.

Briefly speaking, controller 64 switches from the slip lockup control mode to the release mode when the difference (Ne−Nt) becomes less than the first criterion (−500 rpm) during the slip lockup control mode initiated owing to the first transition from the vehicle's driving condition to the predetermined coast slip lockup area (see the flow from step S108 via step S109 to step S110). Also, controller 64 inhibits the switching operation from the slip lockup control mode to the release mode when the downshift occurs under a condition that the difference (Ne−Nt) is less than the first criterion such as −500 rpm (see the flow step S108 via step S109 to step S105).

Details of the coast slip lockup control executed by the system of the first embodiment are hereinafter described in detail in reference to the time charts shown in FIGS. 4A–4D and 5A–5D. In each of the time charts, the signal wave shown as "TVO" represents the throttle opening, the signal wave shown as "L/U DUTY" represents the lockup duty ratio, the signal wave shown as "Nt" represents the turbine speed, and the signal wave shown as "Ne" represents the engine speed.

Figure 4A:
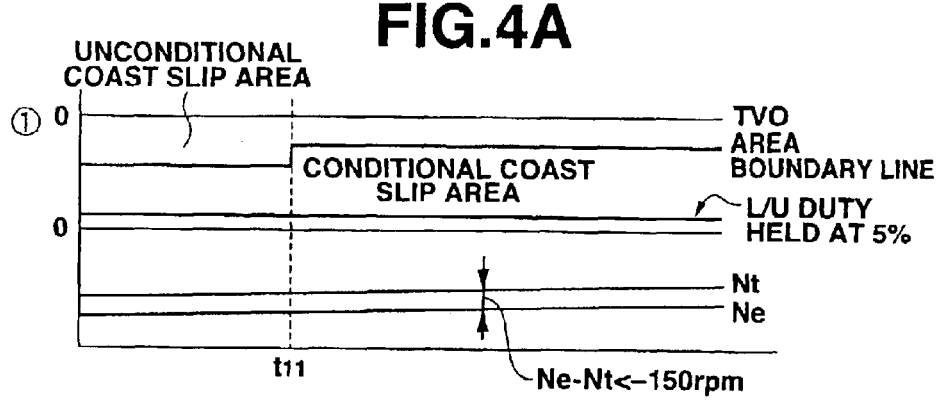
FIGS. 4A–4D are time charts each showing the system operation of the first embodiment in presence of a transition from either one of different operating points ①, ②, and ③ to a conditional coast slip area.

FIG. 4A is the time chart explaining the system operation of the first embodiment in the presence of the transition from the engine/vehicle operating point ① contained in the unconditional coast slip lockup area to a certain operating point contained in the conditional coast slip lockup area. In this case, the routine of FIG. 3 flows from step S101 through steps S102 and S103 again to step S101, and then advances via steps S102 and S104 to step S105. Just before the transition from the operating point ① to the conditional coast slip lockup area, the system is still executing the coast slip lockup control within the unconditional coast slip lockup area, so that the difference (Ne−Nt), obtained by subtracting turbine speed Nt from engine speed Ne, is brought closer to a value greater than the predetermined criterion value such as −150 rpm by way of closed-loop feedback control. Concretely, the lockup duty ratio is held at approximately 5% (see FIG. 4A). Owing to a slippage of lockup clutch 18, corresponding to the lockup duty ratio held at approximately 5%, the vehicle speed gradually drops and becomes less than or equal to predetermined vehicle speed $VSP_0$, such as 120 km/h (see the time $t_{11}$ of FIG. 4A). Therefore the operating point enters the conditional coast slip lockup area. At this time, the feedback control is executed so that the speed difference |Ne−Nt| between engine speed Ne and turbine speed Nt is brought closer to the value greater than the predetermined criterion value such as −150 rpm, and thus the lockup control system continues the coast slip lockup control (see the flow from step S104 to step S105).

Figure 4B:
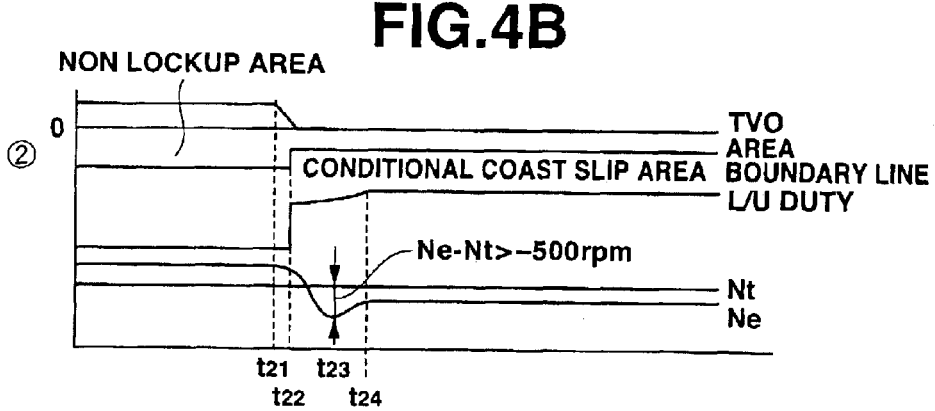

FIG. 4B is the time chart explaining the system operation of the first embodiment in the presence of the transition from the engine/vehicle operating point ② contained in the 5th gear range and non-lockup and drive operating mode area to a certain operating point contained in the conditional coast slip lockup area. In this case, the routine of FIG. 3 flows from step S101 through steps S102, S104, S105, S106, and S108 to step S105. When the accelerator pedal is released at the time $t_{21}$, the throttle opening also drops and the operating point gradually shifts toward the conditional coast slip lockup area (see the arrow directed downwards from the operating point ② in the map shown in FIG. 2). Actually, the operating point enters the conditional coast slip lockup area at the time $t_{22}$. This is because, at the time $t_{22}$ the speed difference |Ne−Nt| between engine speed Ne and turbine speed Nt satisfies the condition defined by (Ne−Nt)>−150 rpm and thus the slip lockup control is initiated. Thereafter, engine speed Ne also drops due to the releasing action of the accelerator pedal, and then the speed difference |Ne−Nt| between engine speed Ne and turbine speed Nt reaches a maximum value at the time $t_{23}$, but the difference (Ne−Nt), obtained by subtracting turbine speed Nt from engine speed Ne, is greater than the predetermined criterion value such as −500 rpm, that is, the condition of (Ne−Nt)>−500 rpm is satisfied. In such a case, the system of the first embodiment adjusts the lockup duty ratio to a higher level and continually execute the coast slip lockup control, so that the speed difference |Ne−Nt| between engine speed Ne and turbine speed Nt is adjusted to the predetermined value. In FIG. 4B, immediately when the predetermined speed difference |Ne−Nt| between engine speed Ne and turbine speed Nt has been reached at the time $t_{24}$, the lockup control system operates to remain the lockup duty ratio unchanged. In this manner, the system of the first embodiment executes the coast slip lockup control in the presence of the transition from the transition from the engine/vehicle operating point ② to the conditional coast slip lockup area.

Figure 4C:
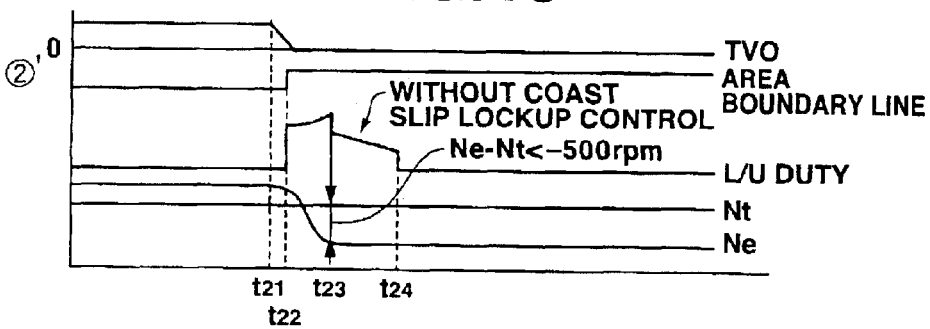

FIG. 4C is the time chart explaining the system operation of the first embodiment in the presence of the transition from the engine/vehicle operating point ② contained in the 5th gear range and non-lockup and drive operating mode area to a certain operating point contained in the conditional coast slip lockup area and when under a particular engine/vehicle operating condition that the vehicle experiences a more rapid engine speed drop in comparison with a drop in engine speed Ne shown in FIG. 4B. Due to the difference of the time rate of decrease in engine speed Ne, the system operation shown in the time chart of FIG. 4C differs from that of FIG. 4B. Thus in FIGS. 4B and 4C, the initial operating state of FIG. 4B is denoted by ②, while the initial operating state of FIG. 4C is denoted by ②', in order to distinguish the system operation of FIG. 4B from that of FIG. 4C. In this case, the routine of FIG. 3 flows from step S101 through steps S102, S104, S105, S106, and S108 to step S105, and then flows through step S106 to step S107. When the accelerator pedal is released at the time $t_{21}$, the operating point shifts toward the conditional coast slip lockup area (see the arrow directed downwards from the operating point ② in the map shown in FIG. 2). Actually, the operating point enters the conditional coast slip lockup area at the time $t_{22}$. This is because, at the time $t_{22}$ the speed difference |Ne−Nt| between engine speed Ne and turbine speed Nt satisfies the condition defined by (Ne−Nt)>−150 rpm and thus the slip lockup control is initiated. Thereafter, engine speed Ne more rapidly drops due to both the releasing action of the accelerator pedal and the particular engine/vehicle operating condition such as uphill driving. The difference (Ne−Nt), which is obtained by subtracting turbine speed Nt from engine speed Ne, becomes less than the predetermined criterion value such as −500 rpm (that is, Ne−Nt<−500 rpm) at the time $t_{23}$. In other words, the speed difference |Ne−Nt| between engine speed Ne and turbine speed Nt becomes greater. The greater speed difference may result in a great torque shock when initiating the coast slip lockup control. Therefore, under this condition, the system of the first embodiment prevents or inhibits the coast slip lockup control from initiating, and then sets the lockup duty ratio to "0" at the time $t_{24}$. As discussed above, such a case that a rapid engine speed drop occurs owing to the particular engine/vehicle operating condition as well as the releasing action of the accelerator pedal even during the vehicle's driving condition, is similar to a case that the slip lockup control initiates from the vehicle's coasting condition during which there is an increased tendency for a comparatively great torque shock to occur. For the reasons set forth above, to avoid the undesired torque shock during lockup-clutch engagement, the system of the first embodiment prevents or inhibits the coast slip lockup control under the particular engine/vehicle operating condition that a more rapid engine speed drop occurs.

Figure 4D:
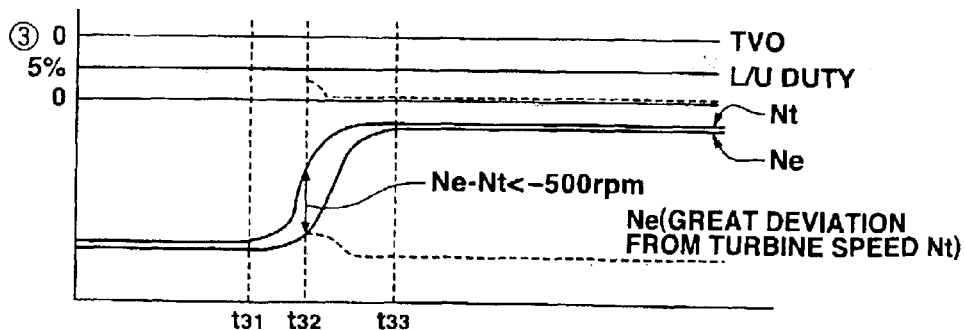

FIG. 4D is the time chart explaining the system operation of the first embodiment in the presence of the transition from the engine/vehicle operating point ③ contained in the 5th gear range and conditional coast slip lockup area to a different operating point contained in the same conditional coast slip lockup area via the 5th-to-4th downshift line. In this case, the routine of FIG. 3 flows from step S101 through steps S102, S104, S105, S106, S108 and S109 to step S105. Just before the transition from the operating point ③ to the conditional coast slip lockup area, the system is still executing the coast slip lockup control in the 5th gear range. As seen from the arrow directed leftwards from the operating point ③ in the map shown in FIG. 2, the vehicle speed gradually drops. In accordance with the vehicle speed drop, the engine/vehicle operating point shifts from the initial operating point ③ toward the 5th-to-4th downshift line. As soon as the operating point passes the 5th-to-4th downshift line toward the speed-reduction side (lower ratio) at the time $t_{31}$, a 5–4 downshift initiates. During the 5–4 downshifting, engine speed Ne tends to increase with a slight time delay ($t_{32}$−$t_{31}$) after a rise in turbine speed Nt. Thus, the difference (Ne−Nt), obtained by subtracting turbine speed Nt from engine speed Ne, becomes less than the predetermined criterion value such as −500 rpm (see the difference Ne−Nt (<−500 rpm) at the time $t_{32}$ of FIG. 4D). Assuming that the lockup control system cancels or releases the coast slip control (the coast slip lockup feature) under the specified condition of (Ne−Nt)<−500 rpm during the 5–4 downshift and does not reapply lockup clutch 18 after the 5–4 downshift has been completed, the speed difference |Ne–Nt| between engine speed Ne and turbine speed Nt tends to become excessively greater (see a great deviation of engine speed Ne from turbine speed Nt, indicated by the broken line in FIG. 4D). In such a case, there is a drawback that it is impossible to restart the coast slip lockup control until the predetermined vehicle speed is reached. For the reason set forth above, during the downshifting, even when the difference (Ne–Nt) becomes less than the predetermined criterion value such as –500 rpm, in other words, the speed difference |Ne–Nt| between engine speed Ne and turbine speed Nt becomes considerably greater, the system of the first embodiment maintains the lockup duty ratio at the predetermined duty ratio such as 5%, in a manner so as to maintain the coast slip lockup control by reapplying lockup clutch 18 after the 5–4 downshift has been completed at the time $t_{33}$.

Figure 5A:
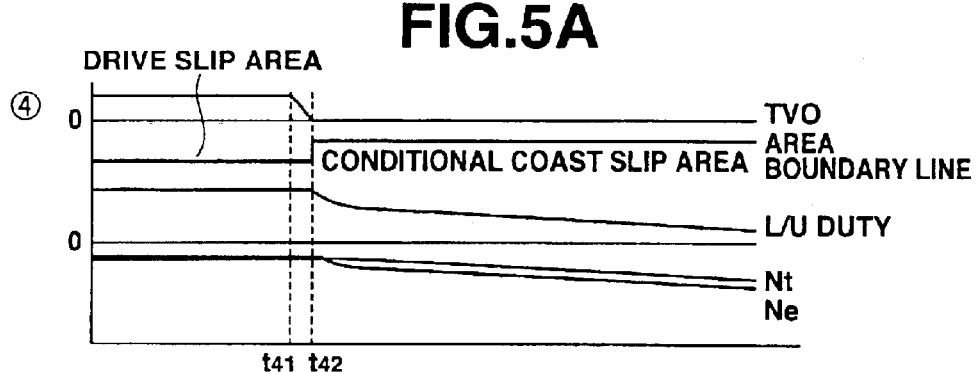
FIGS. 5A–5D are time charts each showing the system operation of the first embodiment in presence of a transition from either one of different operating points ④, ⑤, ⑥, and ⑦ to a conditional coast slip area.

FIG. 5A is the time chart explaining the system operation of the first embodiment in the presence of the transition from the engine/vehicle operating point ④ contained in the drive slip area to a certain operating point contained in the conditional coast slip lockup area. In this case, the routine of FIG. 3 flows from step S101 through steps S102, S104, S105, S106, and S108 to step S105. During the drive slip control, the accelerator pedal is released at the time $t_{41}$. Thus, the throttle opening begins to reduce from $t_{41}$. Thereafter, at the time $t_{42}$, a transition of the engine/vehicle operating condition to the conditional coast slip area occurs (see the arrow directed downwards from the operating point ④ in the map shown in FIG. 2). Just before the transition from the operating point ④ to the conditional coast slip lockup area, the lockup control system is executing the drive slip control. Thus, the difference (Ne–Nt), obtained by subtracting turbine speed Nt from engine speed Ne, becomes a value closer to "0", such as a speed difference ranging +30 rpm to +70 rpm. Under these conditions, the lockup control system maintains and continues the slip lockup control mode after the transition from the drive slip area to the conditional coast slip area. The magnitude of input torque from the drive wheels to the torque converter during the coast slip lockup control executed within the conditional coast slip area tends to be less than that from the engine to the torque converter during drive slip control executed within the drive slip area. Thus, during the coast slip lockup control executed within the conditional coast slip area, the lockup control system decreasingly compensates for the lockup duty ratio depending on the magnitude of input torque from the drive wheels to the torque converter, such that the predetermined speed difference between engine speed Ne and turbine speed Nt is attained or maintained.

Figure 5B:
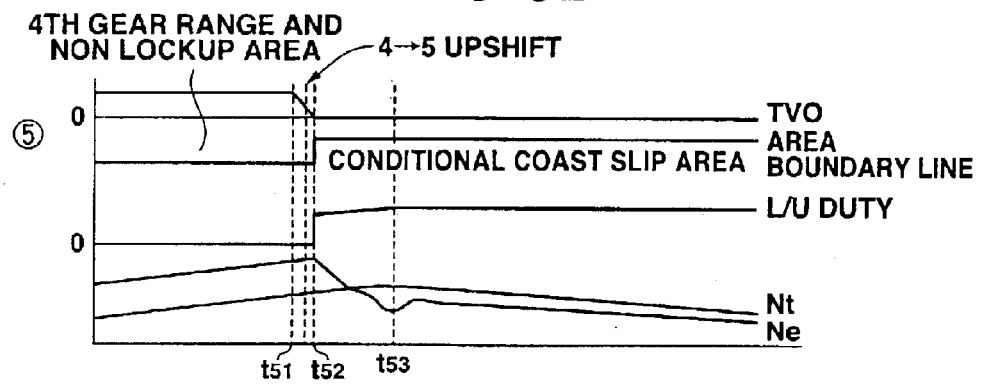

FIG. 5B is the time chart explaining the system operation of the first embodiment in the presence of the transition from the engine-vehicle operating point ⑤ contained in the 4th gear range and non-lockup and drive operating mode area to a certain operating point contained in the conditional coast slip lockup area via the 4th-to-5th upshift line. In this case, the routine of FIG. 3 flows from step S101 through steps S102, S104, S105, S106, S108 and S109 to step S105. When the accelerator pedal is released at the time $t_{51}$ under the vehicle's driving condition with lockup clutch 18 released, the throttle opening also drops (see the arrow directed downwards from the operating point ⑤ in the map shown in FIG. 2). In accordance with the decrease in throttle opening TVO, the engine/vehicle operating point passes the 4th-to-5th upshift line at the substantially intermediate point between the time points $t_{51}$ and $t_{52}$, and then a 4–5 upshift initiates. Thereafter, a transition to the conditional coast slip area occurs at the time $t_{52}$. As soon as the 4–5 upshift has been initiated, engine speed Ne drops temporarily and then turbine speed Nt begins to drop with a time delay. At the time $t_{52}$, the condition defined by (Ne–Nt)>–150 rpm is satisfied and therefore the lockup duty ratio is set or increased to a predetermined initial duty ratio (see a rapid rise in the lockup duty ratio L/U DUTY at $t_{52}$ in FIG. 5B), and then gradually incremented in accordance with a predetermined control gain by way of the feedback control (see a slightly up-sloped lockup duty ratio between the time interval from $t_{52}$ to $t_{53}$ in FIG. 5B). Owing to such an increase in the lockup duty ratio, engine speed Ne begins to increase after the temporary engine speed drop (see the change in engine speed Ne during the time period from $t_{52}$ to $t_{53}$). At this time, the difference (Ne–Nt), obtained by subtracting turbine speed Nt from engine speed Ne, is kept above –500 rpm and thus the routine of FIG. 3 flows from step S108 to step S105, so that the lockup control system executes the coast slip lockup control.

Figure 5C:
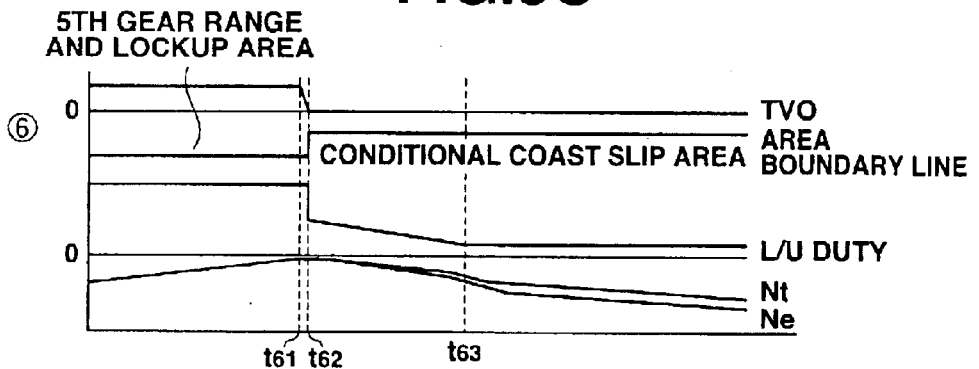

FIG. 5C is the time chart explaining the system operation of the first embodiment in the presence of the transition from the engine/vehicle operating point ⑥ contained in the 5th gear range and lockup and drive operating mode area to a certain operating point contained in the conditional coast slip lockup area. In this case, the routine of FIG. 3 flows from step S101 through steps S102, S104, S105, S106, and S108 to step S105. When the accelerator pedal is released at the time $t_{61}$ under the vehicle's driving condition with lockup clutch 18 fully engaged, the throttle opening also drops (see the arrow directed downwards from the operating point ⑥ in the map shown in FIG. 2). In accordance with the decrease in throttle opening TVO, a transition to the conditional coast slip area occurs at the time $t_{62}$. Before the transition from the engine/vehicle operating point ⑥ to the conditional coast slip lockup area, the lockup duty ratio is set to the high duty ratio (see the high duty ratio before the time $t_{61}$ of FIG. 5C) to maintain the completely engaged state (the lockup mode) of lockup clutch 18 in which the speed difference between engine speed Ne and turbine speed Nt (the speed difference between torque-converter input and output speeds) is "0". Thus, as soon as the transition from the engine/vehicle operating point ⑥ to the conditional coast slip lockup area, the lockup duty ratio is set or reduced to the predetermined initial duty ratio (see a rapid fall in the lockup duty ratio L/U DUTY at $t_{62}$ in FIG. 5C), and then gradually decremented in accordance with a predetermined control gain by way of the feedback control (see a slightly down-sloped lockup duty ratio between the time interval from $t_{62}$ to $t_{63}$ in FIG. 5C), such that the speed difference |Ne–Nt| between engine speed Ne and turbine speed Nt is brought closer to the predetermined speed difference (the desired value). Immediately when the predetermined speed difference |Ne–Nt| between engine speed Ne and turbine speed Nt has been reached at the time $t_{63}$, the lockup control system operates to remain the lockup duty ratio unchanged. In this manner, the coast slip lockup control is executed in the presence of the transition from the engine/vehicle operating point ⑥ to the conditional coast slip lockup area.

Figure 5D:
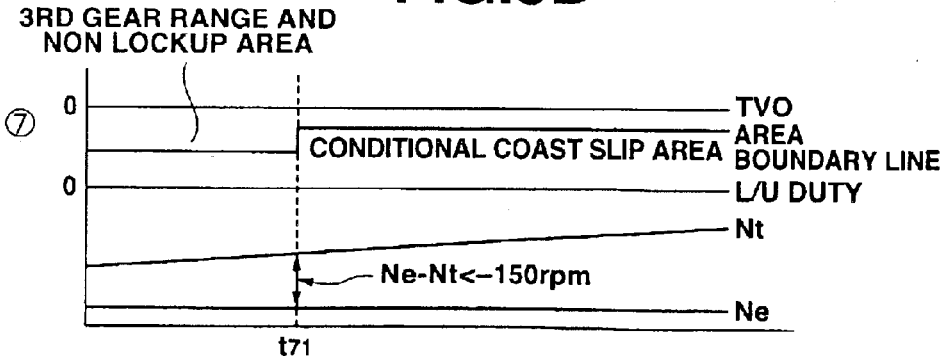

FIG. 5D is the time chart explaining the system operation of the first embodiment in the presence of the transition from the engine/vehicle operating point ⑦ contained in the 3rd gear range and non-lockup and coast operating mode area to a certain operating point contained in the conditional coast slip lockup area. In this case, the routine of FIG. 3 flows from step S101 through steps S102 and S104 to step S110. For instance, when the vehicle is coating downhill, the vehicle speed tends to increase. Owing to the increase in the vehicle speed, the operating point gradually shifts rightwards (see the arrow directed rightwards from the operating point ⑦ in the map shown in FIG. 2). At the time $t_{71}$ shown in FIG. 5D, a transition from the operating point ⑦ to the conditional coast slip area occurs. During coasting, the difference (Ne–Nt), obtained by subtracting turbine speed Nt from engine speed Ne, is less than the predetermined criterion value such as –150 rpm (Ne–Nt<–150 rpm), in other words, the speed difference |Ne–Nt| between engine speed Ne and turbine speed Nt is greater. Additionally, during coasting, the distance of the lockup piston relative to the torque converter cover tends to become a maximum and thus the increased time rate of change in hydraulic pressure is required, thereby causing a rapid axial movement of lockup piston 18. As previously discussed, the greater speed difference |Ne–Nt| as well as the rapid axial movement of lockup piston 18 means a great torque shock when switching from the non-lockup mode (the completely-disengaged state) to the lockup mode (the completely-engaged state) or when switching from the non-lockup mode (the completely-disengaged state) to the coast slip lockup control mode (the partially-engaged state). For the reasons set forth above, in the presence of the transition from the operating point ⑦ to the conditional coast slip area, the system of the first embodiment prevents or inhibits the coast slip lockup control from initiating, and thus maintains the lockup duty ratio at "0" after the time $t_{71}$.

As can be seen from the lower left-hand diagonal shading area (the conditional coast slip area) further added to the lower right-hand side area of FIG. 2 (the unconditional coast slip area), the lockup control system of the first embodiment shown in FIGS. 1–3 can ensure the wide coast slip lockup area containing the low and middle vehicle speed range as well as the high vehicle speed range. Therefore, the system of the first embodiment can avoid or prevent undesirable torque shock, and assure a better engine braking performance, and improve fuel economy over wider range of conditions under which the engine/vehicle operates, in particular, in automotive vehicles with a deceleration fuel cutoff device.

Figure 6:
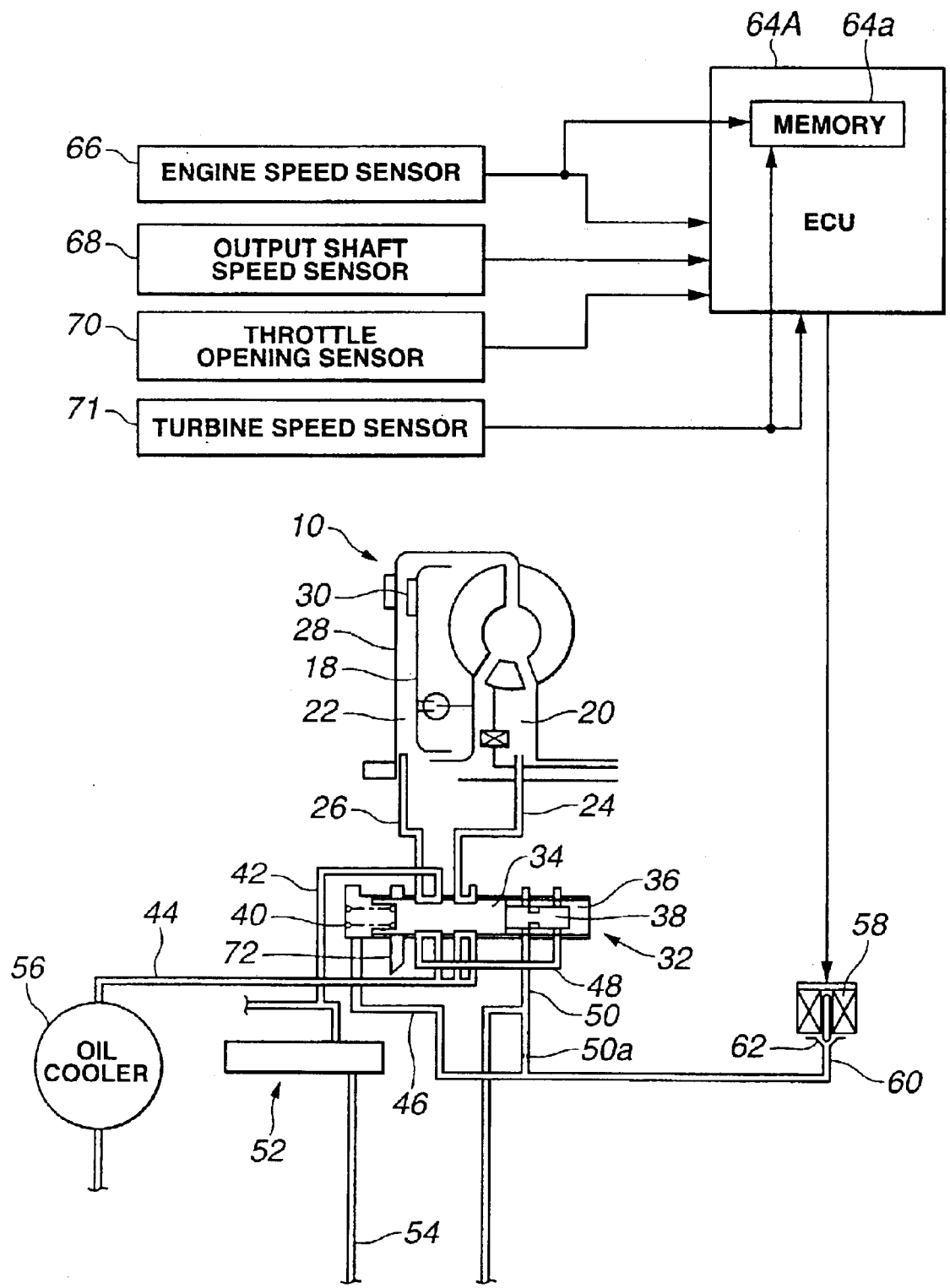
FIG. 6 is a system block diagram illustrating a second embodiment of a lockup control system of an automatic transmission.
Figure 7:
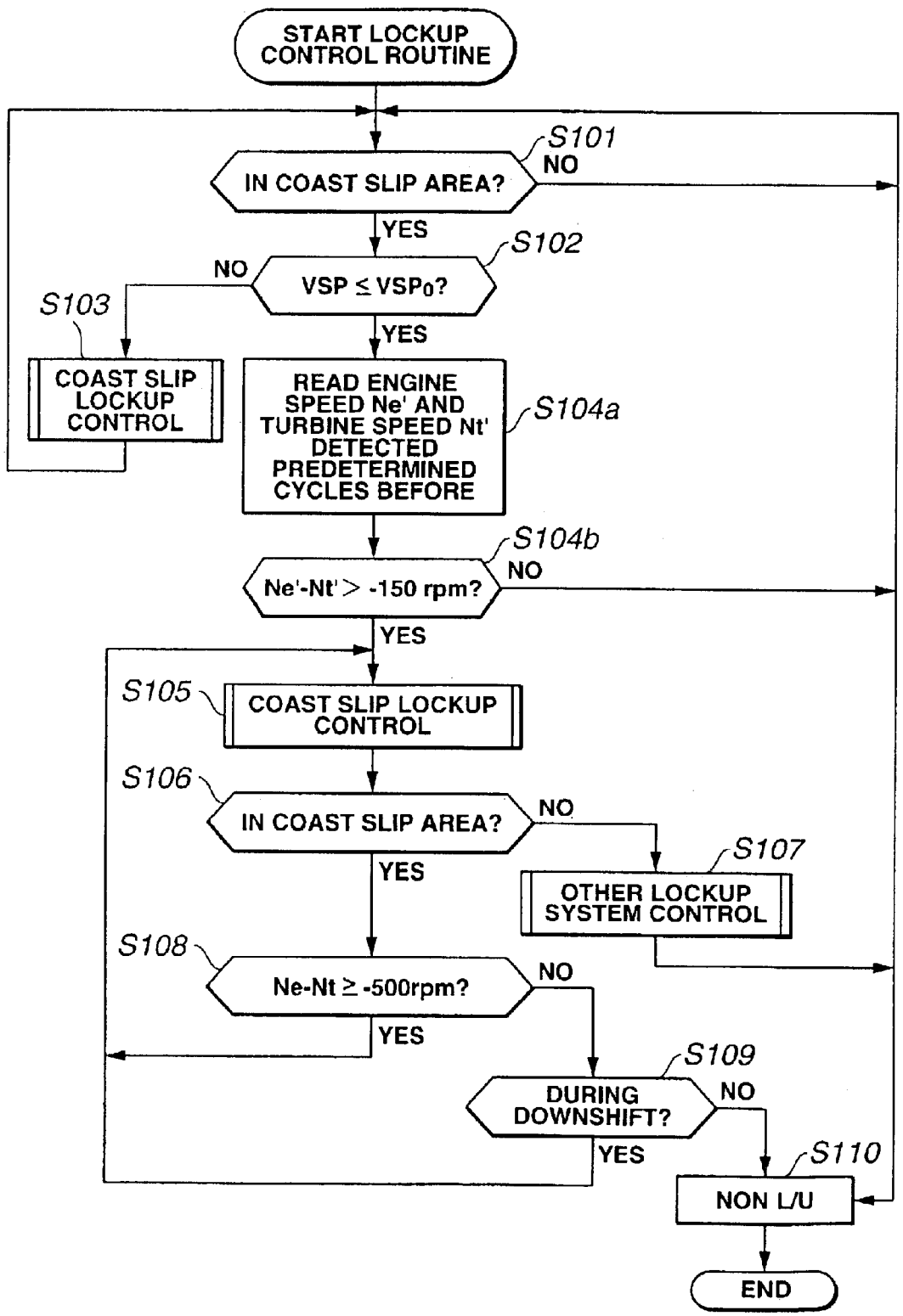
FIG. 7 is a flow chart illustrating a lockup control routine executed by the system of the second embodiment.

Referring now to FIG. 6, there is shown the system block diagram of the lockup control system of the second embodiment. The lockup control system of the second embodiment is slightly different from that of the first embodiment, in that the system of the second embodiment utilizes the old engine speed data Ne' and the old turbine speed Nt', both detected and stored predetermined cycles before (or before a predetermined time period from the time when the transition to the coast slip lockup area occurs), in order to estimate or determine whether the engine/vehicle operating condition (the operating point) detected just before the transition to the conditional coast slip area is the vehicle's coasting condition or the vehicle's driving condition. In explaining the second embodiment, for the purpose of simplification of the disclosure, the same reference signs used to designate elements in the first embodiment will be applied to the corresponding elements used in the second embodiment, while detailed description of the same reference signs will be omitted because the above description thereon seems to be self-explanatory. As shown in FIG. 6, a controller 64A of the system of the second embodiment has a memory 64a that stores engine speed Ne data detected by engine speed sensor 66 and turbine speed Nt data detected by turbine speed sensor 71 every control cycles of controller 64A. As necessary, the old engine speed data Ne' and the old turbine speed data Nt' detected and stored predetermined cycles before can be extracted. The system operation, which is performed by the lockup control system of the second embodiment of FIG. 6, is hereunder described in detail in reference to the flow chart of FIG. 7.

At step S104a, the old engine speed data Ne' and the old turbine speed data Nt', both detected and stored in memory 64a the predetermined control cycles before, are read.

At step S104b, a comparison check is made to determine whether a difference (Ne'–Nt'), which is obtained by subtracting the old turbine speed data Nt' from the old engine speed data Ne', is greater than a predetermined criterion value such as –150 rpm. That is, the system of the second embodiment estimates or determines, based on the comparison result of the predetermined criterion value (–150 rpm) and the difference (Ne'–Nt') of the old speed data Ne' and Nt', whether the engine/vehicle operating condition (the operating point) detected just before the transition to the conditional coast slip area is the vehicle's coasting condition or the vehicle's driving condition. Concretely, when the difference (Ne'–Nt') is greater than the predetermined criterion value (–150 rpm), that is, in case of (Ne'–Nt')>–150 rpm, the system of the second embodiment determines that the engine/vehicle operating condition detected just before the transition to the conditional coast slip area is equal to the vehicle's driving condition during which torque is transferred from the engine to the drive wheels. In this case, the routine proceeds from step S104b to step S105. On the contrary, when the difference (Ne'–Nt') is less than or equal to the predetermined criterion value such as –150 rpm, that is, in case of (Ne'–Nt')≦–150 rpm, the system of the second embodiment determines that the engine/vehicle operating condition detected just before the transition to the conditional coast slip area is equal to the vehicle's coasting condition. In this case, the routine proceeds from step S104b to step S110. That is, the comparison check of step S104b is based on the assumption that the difference (Ne'–Nt'), obtained by subtracting the old turbine speed data Nt' detected the predetermined cycles before from the old engine speed data Ne' detected the predetermined cycles before, tends to be greater than the predetermined criterion value such as –150 rpm (Ne–Nt>–150 rpm) under the vehicle's driving condition that torque is transferred from the engine to the drive wheels. In certain circumferences during the vehicle's driving condition, the engine speed may be greater than the turbine speed. For the reasons discussed above, it is possible to estimate or determine from the comparison result of the predetermined criterion value (–150 rpm) and the difference (Ne'–Nt') of the old speed data Ne' and Nt', both detected the predetermined cycles before, whether the engine/vehicle operating condition (the operating point) detected just before the transition to the conditional coast slip area is the vehicle's coasting condition or the vehicle's driving condition. Briefly speaking, according to the system of the second embodiment, controller 64A determines that the operating condition detected before the transition is the vehicle's driving condition, when the difference (Ne'–Nt') is the positive value, that is, in case of Ne'>Nt'. In contrast, controller 64A determines that the operating condition detected before the transition is the vehicle's coasting condition, when the difference (Ne'–Nt') is the negative value, that is, in case of Ne'<Nt'. By using the old engine speed data Ne' and the old turbine speed data Nt', detected before the predetermined time period from the time when the transition to the predetermined coast slip lockup area occurs, it is possible to widen or enlarge the slip lockup area towards the low vehicle speed range, thereby further improving fuel economy.

Figure 8:
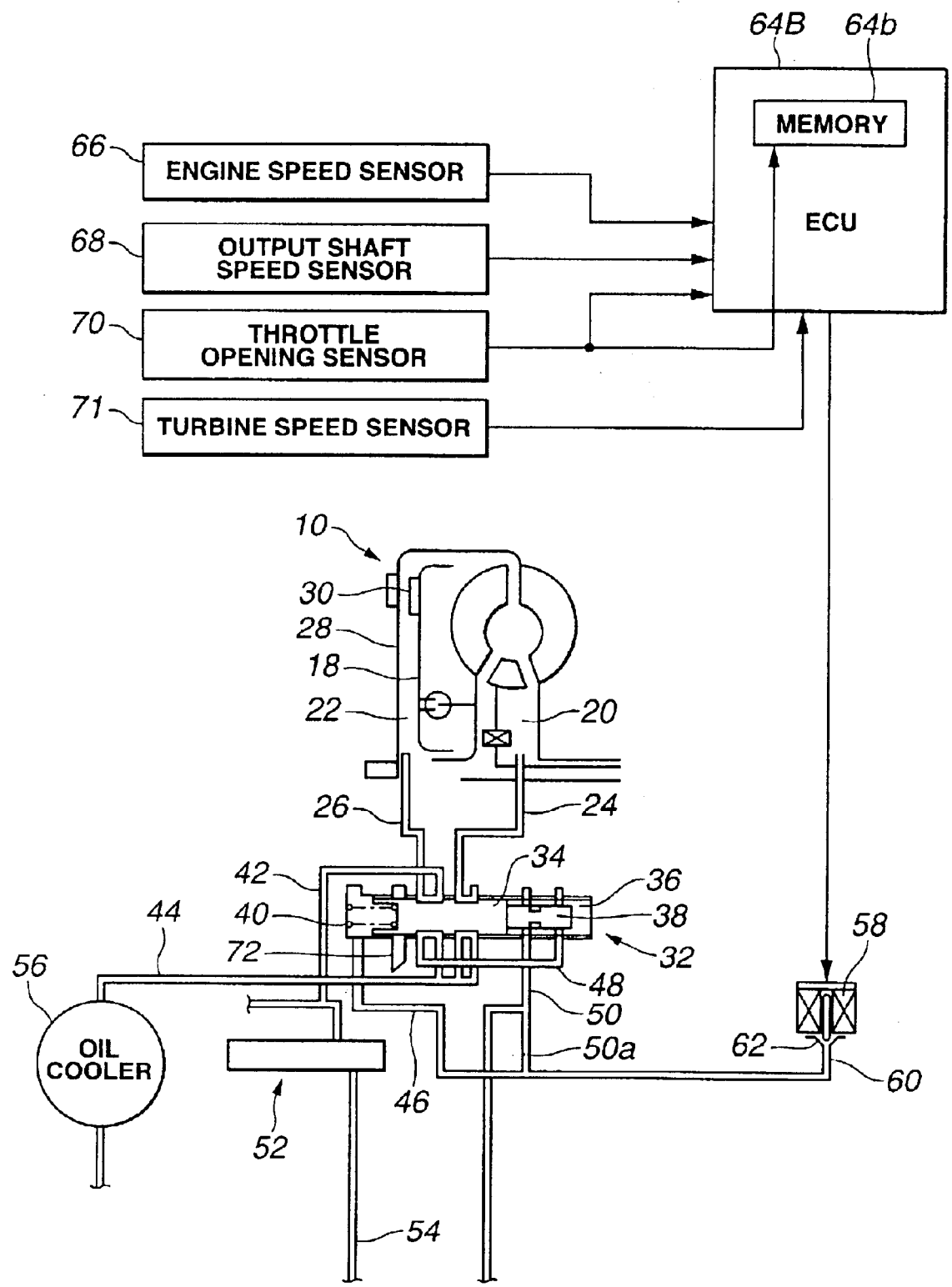
FIG. 8 is a system block diagram illustrating a third embodiment of a lockup control system of an automatic transmission.
Figure 9:
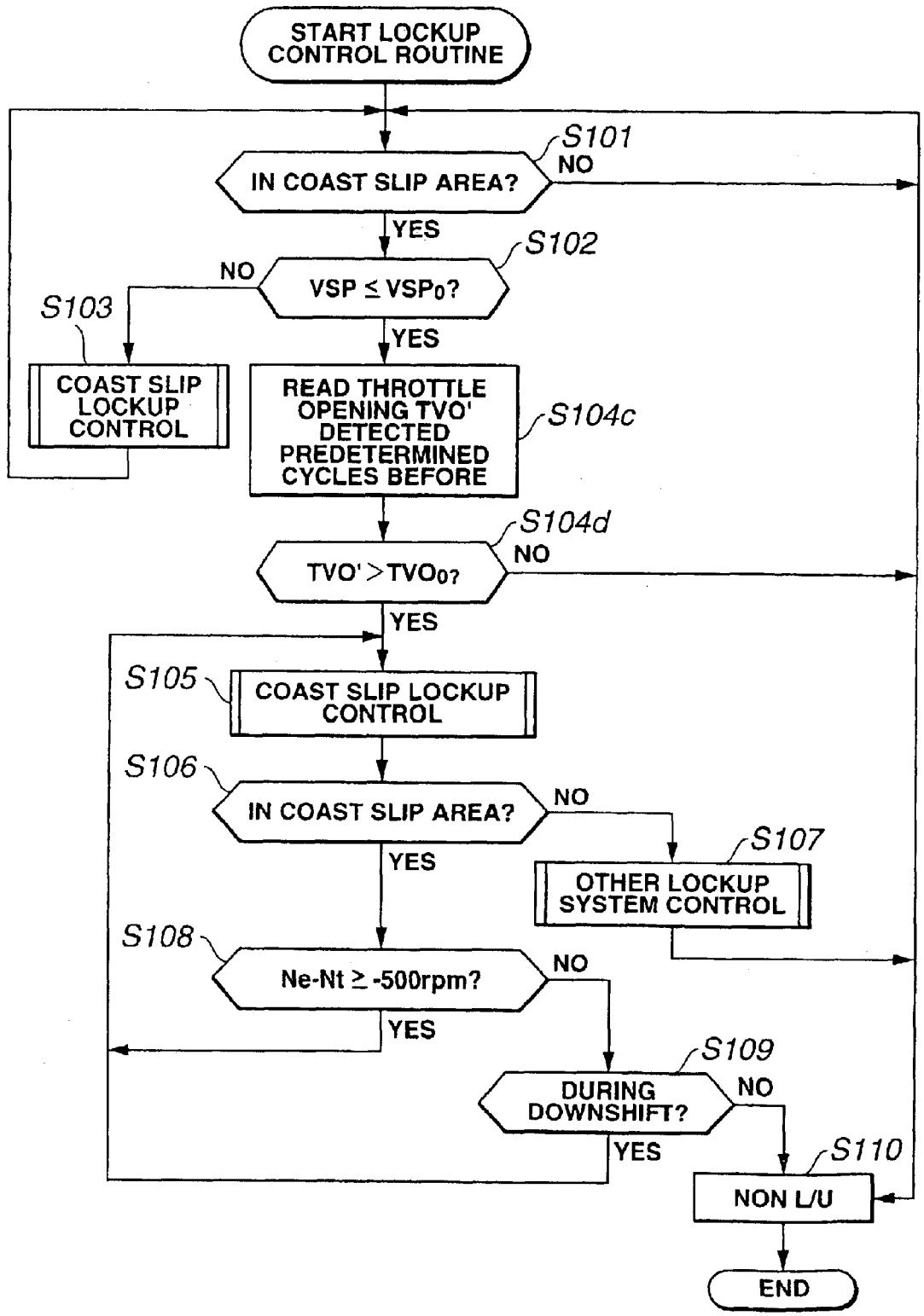
FIG. 9 is a flow chart illustrating a lockup control routine executed by the system of the third embodiment.

Referring now to FIG. 8, there is shown the system block diagram of the lockup control system of the third embodiment. The lockup control system of the third embodiment is slightly different from that of the first embodiment, in that the system of the third embodiment utilizes the old throttle opening data TVO', detected and stored predetermined cycles before, in order to estimate or determine whether the engine/vehicle operating condition (the operating point) detected just before the transition to the conditional coast slip area is the vehicle's coasting condition or the vehicle's driving condition. As shown in FIG. 8, a controller 64B of the system of the third embodiment has a memory 64b that stores throttle opening data TVO detected by throttle opening sensor 70 every control cycles of controller 64B. As necessary, the old throttle opening data TVO' detected and stored predetermined cycles before can be extracted. The system operation, which is performed by the lockup control system of the third embodiment of FIG. 8, is hereunder described in detail in reference to the flow chart of FIG. 9.

At step S104c, the old throttle opening data TVO', detected and stored in memory 64b the predetermined control cycles before, is read.

At step S104d, a comparison check is made to determine whether the old throttle opening data TVO' is greater than a predetermined throttle opening threshold value $TVO_0$. That is to say, the system of the third embodiment estimates or determines, based on the comparison result of the predetermined throttle opening threshold value $TVO_0$ and the old throttle opening data TVO', whether the engine/vehicle operating condition (the operating point) detected just before the transition to the conditional coast slip area is the vehicle's coasting condition or the vehicle's driving condition. Concretely, when the old throttle opening data TVO' is greater than the predetermined throttle opening threshold value $TVO_0$ that is, in case of TVO'>$TVO_0$, the system of the third embodiment determines that the engine/vehicle operating condition detected just before the transition to the conditional coast slip area is equal to the vehicle's driving condition during which torque is transferred from the engine to the drive wheels. In this case, the routine proceeds from step S104d to step S105. On the contrary, when the old throttle opening data TVO' is less than or equal to the predetermined throttle opening threshold value $TVO_0$, that is, in case of TVO≦$TVO_0$, the system of the third embodiment determines that the engine/vehicle operating condition detected just before the transition to the conditional coast slip area is equal to the vehicle's coasting condition. In this case, the routine proceeds from step S104d to step S110. That is, the comparison check of step S104d is based on the assumption that the old throttle opening data TVO' detected the predetermined cycles before tends to be greater than the predetermined throttle opening threshold value $TVO_0$, (TVO'>$TVO_0$) under the vehicle's driving condition that torque is transferred from the engine to the drive wheels. For the reasons discussed above, it is possible to estimate or determine from the comparison result of the predetermined throttle opening threshold value $TVO_0$ and the old throttle opening data TVO' detected the predetermined cycles before, whether the engine/vehicle operating condition (the operating point) detected just before the transition to the conditional coast slip area is the vehicle's coasting condition or the vehicle's driving condition. By using the old throttle opening data TVO' detected the predetermined cycles before, it is possible to widen the slip lockup area towards the low vehicle speed range, thereby further improving fuel economy.

Figure 10:
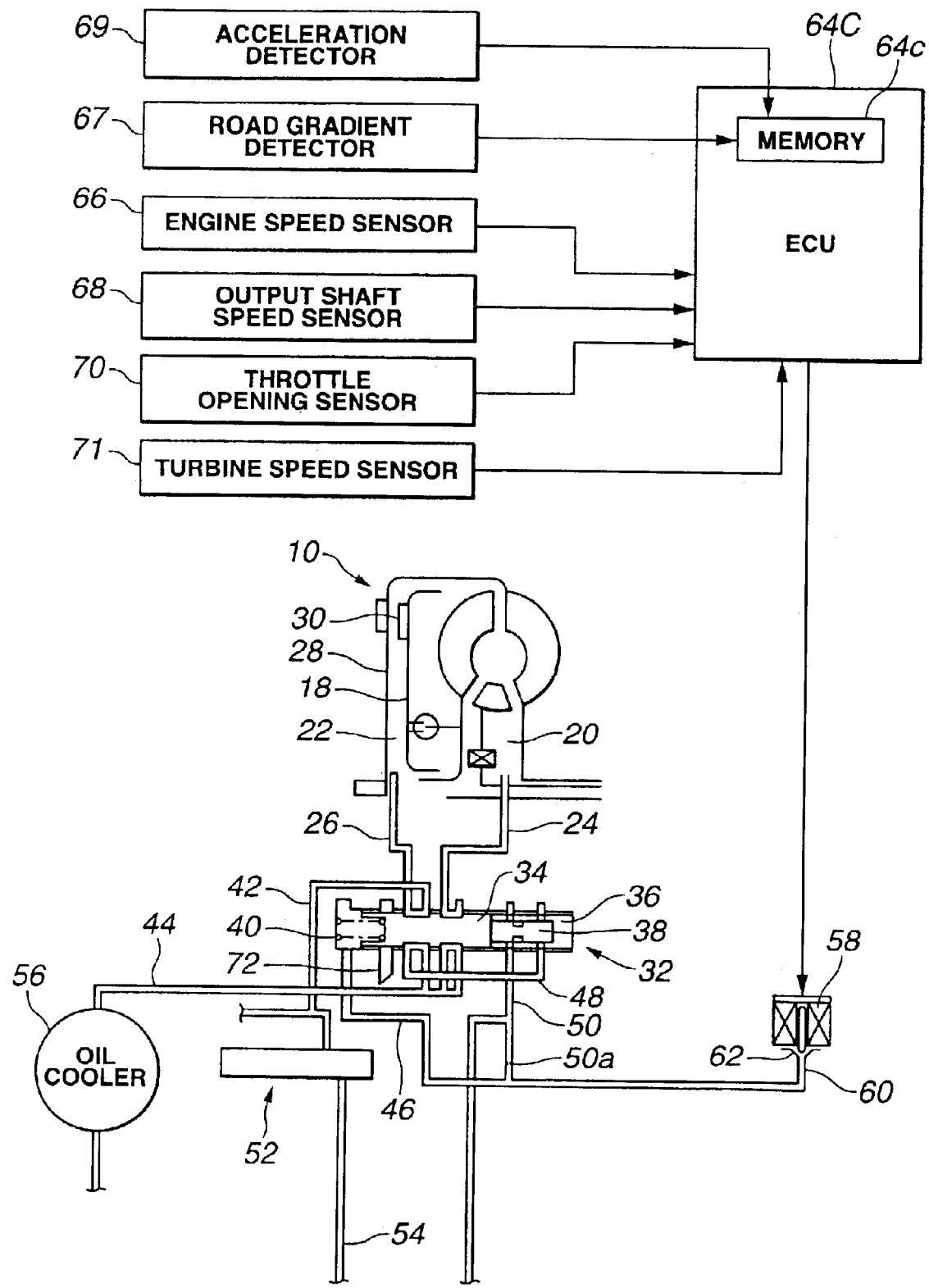
FIG. 10 is a system block diagram illustrating a fourth embodiment of a lockup control system of an automatic transmission.
Figure 11:
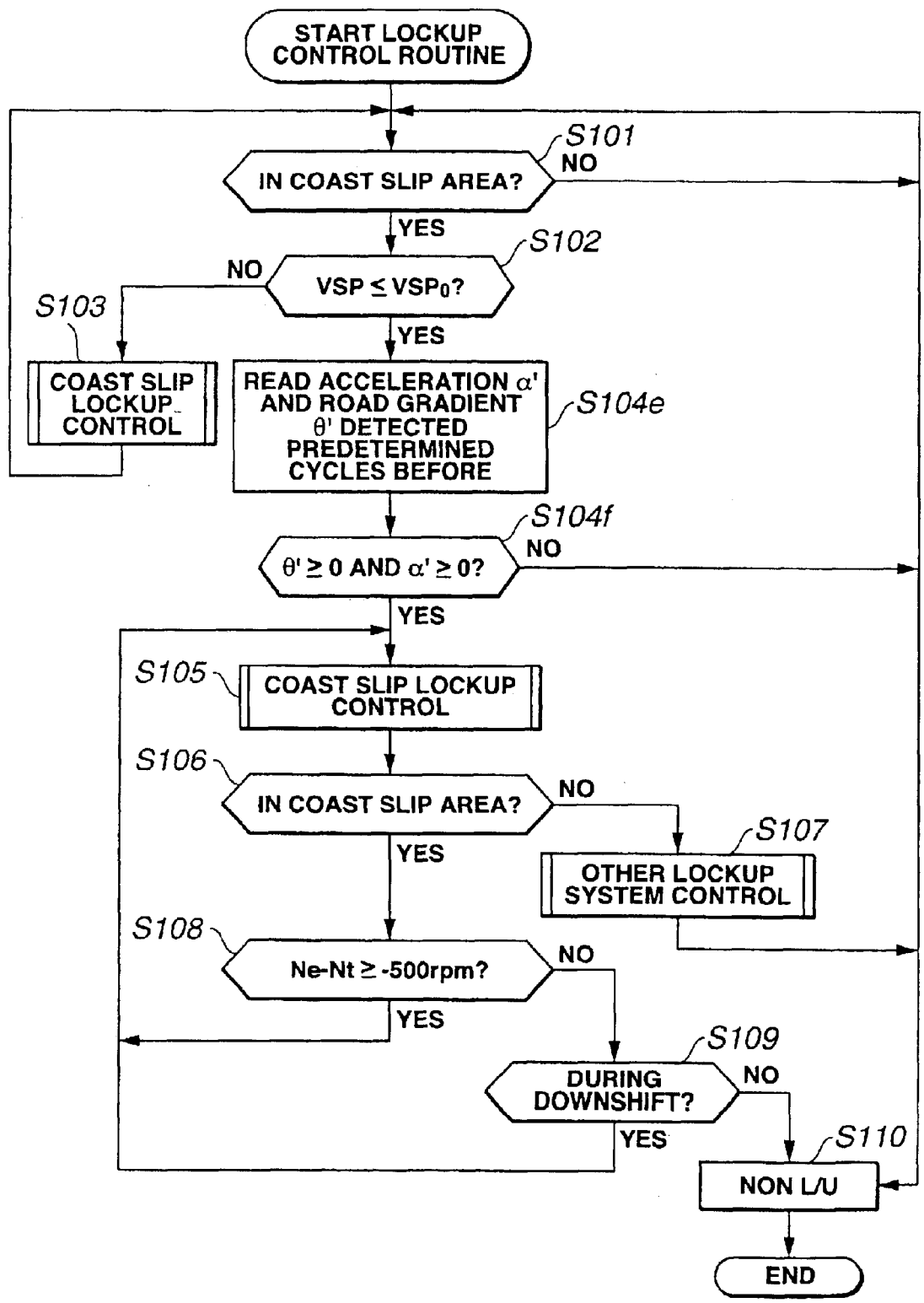
FIG. 11 is a flow chart illustrating a lockup control routine executed by the system of the fourth embodiment.

Referring now to FIG. 10, there is shown the system block diagram of the lockup control system of the fourth embodiment. The lockup control system of the fourth embodiment is slightly different from that of the first embodiment, in that the system of the fourth embodiment utilizes the old vehicle acceleration data α' and the old road gradient data θ', both detected and stored predetermined cycles before, in order to estimate or determine whether the engine/vehicle operating condition (the operating point) detected just before the transition to the conditional coast slip area is the vehicle's coasting condition or the vehicle's driving condition. As shown in FIG. 10, a controller 64C of the system of the fourth embodiment has a vehicle acceleration detector 69 and a road gradient detector 67 in addition to the previously-described sensors 66, 68, 70 and 71, and a memory 64c that stores vehicle acceleration data α detected by acceleration detector 69 and road gradient data θ detected by road gradient detector 67 every control cycles of controller 64C. As necessary, the old vehicle acceleration data α' and the old road gradient data θ', both detected and stored predetermined cycles before can be extracted. The system operation, which is performed by the lockup control system of the fourth embodiment of FIG. 10, is hereunder described in detail in reference to the flow chart of FIG. 11.

At step S104e, the old vehicle acceleration data α' and the old road gradient data θ', both detected and stored in memory 64c the predetermined cycles before, are read.

At step S104f, a comparison check is made to determine whether the old vehicle acceleration data α' is greater than or equal to a predetermined acceleration value such as "0" and additionally the old road gradient data θ' is greater than or equal to a predetermined road gradient such as "0". In case of α'≧0 and θ'≧0, the system of the fourth embodiment determines that the engine/vehicle operating condition detected before the transition to the conditional coast slip area is equal to the vehicle's driving condition during which torque is transferred from the engine to the drive wheels. In this case, the routine proceeds from step S104f to step S105. On the contrary, in case of α'<0 or θ'<0, the system of the fourth embodiment determines that the engine/vehicle operating condition detected just before the transition to the conditional coast slip area is equal to the vehicle's coasting condition. In this case, the routine proceeds from step S104f to step S110. The condition defined by the inequality α'≧0 means that the vehicle has been accelerated at a positive vehicle acceleration rate the predetermined cycles before, and the condition defined by the inequality θ'≧0 means that the vehicle has traveled on flat or upslope roads. On the other hand, during the vehicle's downhill traveling, irrespective of whether a positive vehicle acceleration occurs due to the accelerator-pedal depression, the vehicle may experience another positive acceleration occurring due to the negative road gradient and the dead load of the vehicle itself. Thus, in determining whether the engine/vehicle operating condition (the operating point) detected just before the transition to the conditional coast slip area is the vehicle's driving condition, the lockup control system of the fourth embodiment uses the two necessary conditions defined by α'≧0 (representing the vehicle accelerating state) and θ'≧0 (representing vehicle traveling on flat or upsloped roads). In the system of the fourth embodiment, when the two necessary conditions defined by α'≧0 (the vehicle accelerating state) and θ'≧0 (on flat or upsloped roads) are simultaneously satisfied, the system determines that the engine/vehicle operating condition is equal to the vehicle's driving condition. According to the system of the fourth embodiment, it is possible to more accurately determine or detect whether the vehicle is in the coasting state or in the driving state. The system of the fourth embodiment has the same effects as the first, second, and third embodiments. That is to say, the lockup control system of the fourth embodiment shown in FIGS. 10 and 11 can realize the wide coast lockup slip area containing the low and middle vehicle speed range as well as the high vehicle speed range. Therefore, the system of the fourth embodiment can avoid or prevent undesirable torque shock, and assure a better engine braking performance, and improve fuel economy over wider range of conditions under which the engine/vehicle operates, in particular, in automotive vehicles with a deceleration fuel cutoff device. Additionally, by using the old vehicle acceleration data $\alpha'$ and the old road gradient data $\theta'$, both detected and stored the predetermined cycles before, it is possible to widen the slip lockup area towards the low vehicle speed range, thereby further improving fuel economy.

Figure 12:
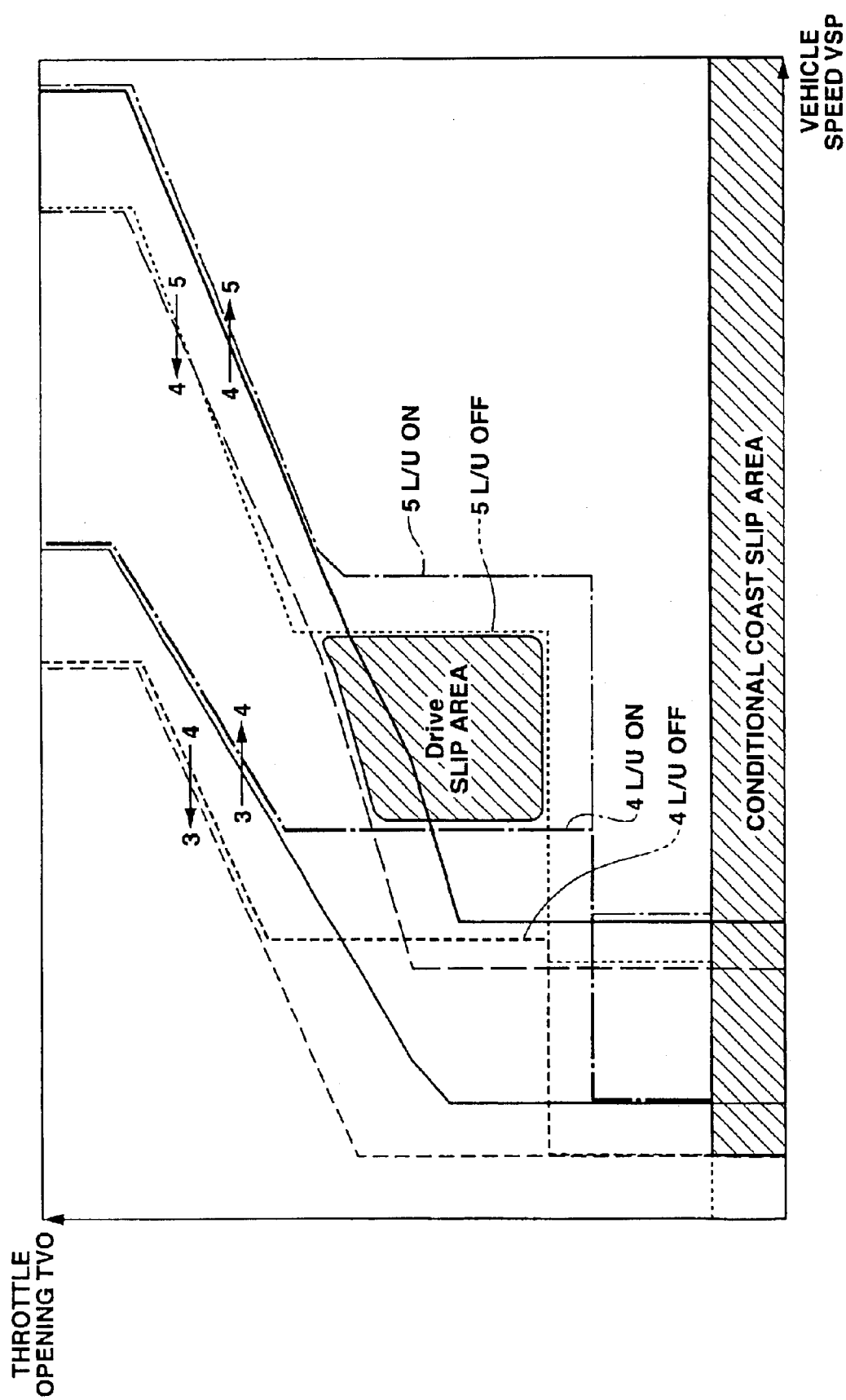
FIG. 12 is a lockup control map for the lockup control system of a fifth embodiment.
Figure 13:
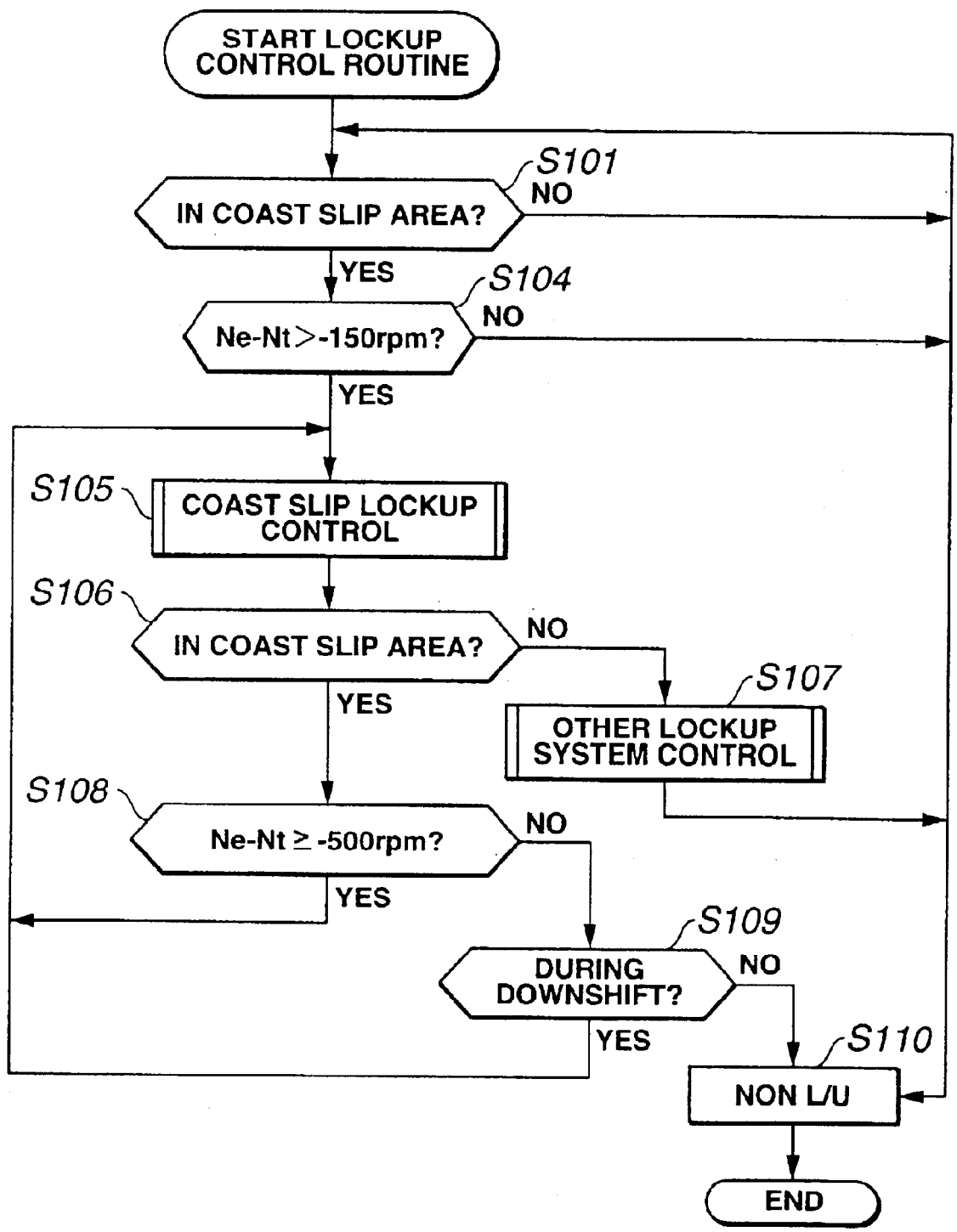
FIG. 13 is a flow chart illustrating a lockup control routine executed by the system of the fifth embodiment.

Referring now to FIG. 12, there is shown the preprogrammed lockup control map according to which lockup clutch 18 is controlled depending on the on duty ratio (the lockup duty ratio) of the duty cycle signal from the controller incorporated in the lockup control system of the fifth embodiment whose system components are basically similar to the first embodiment shown in FIGS. 1–3. As can be appreciated from comparison between the two different lockup control maps of FIGS. 2 and 12, the system of the first embodiment shown in FIGS. 1–3 has the unconditional coast slip lockup area set within the first specified area (TVO<3/32 and VSP>120 km/h) as well as the conditional coast slip lockup area set within the second specified area (TVO<3/32 and 25 km/h<VSP≦120 km/h), whereas the system of the fifth embodiment shown in FIGS. 12 and 13 has only the conditional coast area set within a specified area (TVO<3/32 and 25 km/h<VSP) containing both the first and second specified areas. The system operation of the fifth embodiment executing the torque-converter lockup clutch feedback control based on the lockup control map of FIG. 12 is hereunder described in detail in reference to the flow chart of FIG. 13. As appreciated from comparison between the control routines of the first and fifth embodiments (see FIGS. 3 and 13), the control routine executed by the lockup control system of the fifth embodiment shown in FIG. 13 does not include steps 102 and 103. That is, the system of the fifth embodiment shown in FIGS. 12 and 13 does not have a specific function for determining, based on a comparison result between the current vehicle speed VSP and predetermined vehicle speed $VSP_0$ such as 120 km/h, whether the current engine/vehicle operating point is placed or conditioned in the conditional coast slip area or in the unconditional coast slip area. In the system of the fifth embodiment the unconditional coast slip area is not provided, and thus the system does not forcibly execute the coast slip lockup control based on the comparison result between vehicle speed VSP and predetermined vehicle speed $VSP_0$. At the early stage of each control cycle executed by the system of the fifth embodiment not having the vehicle speed-dependent forcible coast slip lockup control function corresponding to the flow from step S101 via steps S102 and 103 to step S101 in FIG. 3, the system always extracts the latest up-to-date data of engine speed Ne and the latest up-to-date data of turbine speed Nt, and always calculates the difference (Ne−Nt), which is obtained by subtracting the latest up-to-date turbine speed data from the latest up-to-date engine speed data. As appreciated from the above, the system of the fifth embodiment has almost the same operation and effects as the system of the first embodiment shown in FIGS. 1–3, except that the system of the fifth embodiment does not have the vehicle speed-dependent forcible coast slip lockup control function. The lockup control system of the fifth embodiment shown in FIGS. 12 and 13 is somewhat simple in construction, as compared to the first embodiment.

The entire contents of Japanese Patent Application No. 2002-124730 (filed Apr. 25, 2002) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A lockup control system of an automatic transmission with a torque converter having a lockup clutch, comprising:

an operating condition detector that detects an operating condition on an engine and an automotive vehicle, the operating condition including at least a throttle opening and a vehicle speed;

a controller that controls a transmission ratio and an engaging state of the lockup clutch, responsively to an operating point determined based on the throttle opening and the vehicle speed;

the controller pre-storing a predetermined lockup control map including at least a predetermined coast slip lockup area, within which the lockup control system executes a slip lockup control mode under a vehicle's coasting condition that torque is transferred from drive wheels to the engine, so that a speed difference between input and output speeds of the torque converter is brought closer to a predetermined value;

the controller determining whether (i) a first transition from a vehicle's driving condition under which torque is transferred from the engine to the drive wheels to the predetermined coast slip lockup area occurs in a release mode of the lockup clutch or (ii) a second transition from the vehicle's coasting condition to the predetermined coast slip lockup area occurs in the release mode of the lockup clutch; and the controller controlling the lockup clutch depending on whether the first transition occurs or the second transition occurs, so that the lockup clutch is conditioned in the slip lockup control mode when the first transition occurs, and that the lockup clutch is conditioned in the release mode when the second transition occurs.

2. The lockup control system as claimed in claim 1, further comprising:

a vehicle acceleration detector that detects a vehicle acceleration;

a memory that stores the vehicle acceleration;

wherein the controller comprises a comparator that determines whether the vehicle acceleration, stored in the memory before a predetermined time period from a time when either one of the first and second transitions occurs, is greater than or equal to a predetermined acceleration value;

the controller determines that the operating condition, detected before the transition, is the vehicle's driving condition, when the vehicle acceleration, stored in the memory before the predetermined time period from the time when the transition occurs, is greater than or equal to the predetermined acceleration value; and the controller determines that the operating condition, detected before the transition, is the vehicle's coasting condition, when the vehicle acceleration, stored in the memory before the predetermined time period from the time when the transition occurs, is less than the predetermined acceleration value.

3. The lockup control system as claimed in claim 1, further comprising:

a vehicle acceleration detector that detects a vehicle acceleration;

a road gradient detector that detects a road gradient;

a memory that stores the vehicle acceleration and the road gradient;

wherein the controller comprises a comparator that determines whether the vehicle acceleration, stored in the memory before a predetermined time period from a time when either one of the first and second transitions occurs, is greater than or equal to a predetermined acceleration value and additionally the road gradient, stored in the memory before the predetermined time period from the time when the transition occurs, is greater than or equal to a predetermined road gradient;

the controller determines that the operating condition, detected before the transition, is the vehicle's driving condition, when the vehicle acceleration, stored in the memory before the predetermined time period from the time when the transition occurs, is greater than or equal to the predetermined acceleration value and additionally the road gradient, stored in the memory before the predetermined time period from the time when the transition occurs, is greater than or equal to the predetermined road gradient; and the controller determines that the operating condition, detected before the transition, is the vehicle's coasting condition, when the vehicle acceleration, stored in the memory before the predetermined time period from the time when the transition occurs, is less than the predetermined acceleration value, or when the road gradient, stored in the memory before the predetermined time period from the time when the transition occurs, is less than the predetermined road gradient.

4. The lockup control system as claimed in claim 1, further comprising:

an engine speed sensor that detects an engine speed corresponding to the input speed of the torque converter; and a turbine speed sensor that detects a turbine speed corresponding to the output speed of the torque converter;

wherein the controller comprises a comparator that determines whether the difference, obtained by subtracting the turbine speed from the engine speed, is greater than a second criterion value;

the controller determines that the operating condition, detected before either one of the first and second transitions, is the vehicle's driving condition, when the difference is greater than the second criterion value; and the controller determines that the operating condition, detected before the transition, is the vehicle's coasting condition, when the difference is less than or equal to the second criterion value.

5. The lockup control system as claimed in claim 1, further comprising:

an engine speed sensor that detects an engine speed corresponding to the input speed of the torque converter;

a turbine speed sensor that detects a turbine speed corresponding to the output speed of the torque converter; and a memory that stores the engine speed and the turbine speed;

wherein the controller comprises a comparator that determines whether a difference, obtained by subtracting the turbine speed, stored in the memory before a predetermined time period from a time when either one of the first and second transitions occurs, from the engine speed, stored in the memory before the predetermined time period from the time when the transition occurs, is a positive value or a negative value;

the controller determines that the operating condition detected before the transition is the vehicle's driving condition, when the difference is the positive value; and the controller determines that the operating condition detected before the transition is the vehicle's coasting condition, when the difference is the negative value.

6. The lockup control system as claimed in claim 1, further comprising:

a memory that stores the throttle opening;

wherein the controller comprises a comparator that determines whether the throttle opening, stored in the memory before a predetermined time period from a time when either one of the first and second transitions occurs, is greater than a predetermined threshold value;

the controller determines that the operating condition, detected before the transition, is the vehicle's driving condition, when the throttle opening, stored in the memory before the predetermined time period from the time when the transition occurs, is greater than the predetermined threshold value; and the controller determines that the operating condition, detected before the transition, is the vehicle's coasting condition, when the throttle opening, stored in the memory before the predetermined time period from the time when the transition occurs, is less than or equal to the predetermined threshold value.

7. The lockup control system as claimed in claim 1, further comprising:

an engine speed sensor that detects an engine speed corresponding to the input speed of the torque converter; and a turbine speed sensor that detects a turbine speed corresponding to the output speed of the torque converter;

wherein the controller comprises a comparator that determines whether a difference, obtained by subtracting the turbine speed from the engine speed, is less than the first criterion value; and the controller switches from the slip lockup control mode to the release mode, when the difference becomes less than a first criterion value during the slip lockup control mode initiated owing to the first transition.

8. The lockup control system as claimed in claim 7, wherein:

the controller comprises a downshift detector that determines whether a downshift occurs; and the controller inhibits switching from the slip lockup control mode to the release mode, when the downshift occurs under a condition that the difference is less than the first criterion value.

* * * * *